(12) United States Patent
Kanagawa et al.

(10) Patent No.: US 9,018,319 B2
(45) Date of Patent: Apr. 28, 2015

(54) RADICAL-CURABLE HOT-MELT URETHANE RESIN COMPOSITION AND OPTICAL MOLDED BODY

(75) Inventors: Yoshinori Kanagawa, Osaka (JP); Daichi Higuchi, Osaka (JP); Tamotsu Sakamoto, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/809,266

(22) PCT Filed: Dec. 21, 2011

(86) PCT No.: PCT/JP2011/079626
§ 371 (c)(1),
(2), (4) Date: Aug. 27, 2013

(87) PCT Pub. No.: WO2012/096111
PCT Pub. Date: Jul. 19, 2012

(65) Prior Publication Data
US 2014/0303330 A1 Oct. 9, 2014

(30) Foreign Application Priority Data
Jan. 13, 2011 (JP) ................................. 2011-004819

(51) Int. Cl.
| C08L 75/04 | (2006.01) |
| C08G 18/67 | (2006.01) |
| C08G 18/44 | (2006.01) |
| C08G 18/48 | (2006.01) |
| C08G 18/10 | (2006.01) |
| C08G 18/83 | (2006.01) |
| C09J 4/00 | (2006.01) |
| C08G 18/75 | (2006.01) |
| C08G 18/12 | (2006.01) |
| C09D 175/16 | (2006.01) |
| C08F 299/06 | (2006.01) |

(52) U.S. Cl.
CPC ................. *C08G 18/831* (2013.01); *C09J 4/00* (2013.01); *C08G 18/672* (2013.01); *C08G 18/758* (2013.01); *C08G 18/12* (2013.01); *C09D 175/16* (2013.01); *C08G 18/44* (2013.01); *C08G 2170/20* (2013.01); *C08F 299/065* (2013.01)

(58) Field of Classification Search
CPC .... C08F 299/065; C08G 18/12; C08G 18/44; C08G 18/672; C08G 18/664; C08G 18/758; C09D 175/16

USPC .................. 525/452, 453, 454, 455, 457; 522/90–98
See application file for complete search history.

(56) References Cited

U.S. PATENT DOCUMENTS

| 5,426,166 A * | 6/1995 | Usifer et al. ................... 526/301 |
| 2010/0247924 A1* | 9/2010 | Nemoto ..................... 428/423.1 |

FOREIGN PATENT DOCUMENTS

| JP | 2001-040061 A | 2/2001 |
| JP | 2001-040062 A | 2/2001 |
| JP | 2005-248019 A | 9/2005 |
| JP | 2006-213746 A | 8/2006 |
| JP | 2008-169319 A | 7/2008 |
| JP | 2010-037380 A | 2/2010 |
| JP | 2010-180328 A | 8/2010 |
| JP | 2011-157419 A | 8/2011 |
| JP | 2011-208097 A | 10/2011 |
| WO | WO 2009057441 A1 * | 5/2009 |

OTHER PUBLICATIONS

Desmodur W technical data sheet.*
Tetrathane 1000 technical data sheet.*
Duranol Technical Data Sheet.*
International Search Report for PCT/JP2011/079626, mailing date of Apr. 24, 2012.
Japanese Office Action dated Sep. 4, 2012, issued in corresponding Japanese Patent Application No. 2012-524970.

* cited by examiner

*Primary Examiner* — Randy Gulakowski
*Assistant Examiner* — Christopher M Rodd
(74) *Attorney, Agent, or Firm* — Westerman, Hattori, Daniels & Adrian, LLP

(57) ABSTRACT

A radical-curable hot-melt urethane resin composition includes 100 parts by mass of a hot-melt urethane (X) having a (meth)acryloyl group and 0.5 to 5.0 parts by mass of a radical polymerization initiator (Y), wherein the hot-melt urethane (X) is obtained by introducing, using a (meth)acrylate compound (D) having an active-hydrogen-containing group, a (meth)acryloyl group into a hot-melt urethane prepolymer (C) that has isocyanate groups at its terminals and is obtained by a reaction of a polyol (A) and an alicyclic polyisocyanate (B), the polyol (A) containing an aliphatic polycarbonate polyol (a1), an alicyclic polycarbonate polyol (a2), or an aliphatic polyether polyol (a3), in an amount of more than 50 mol % and 100 mol % or less of the total number of isocyanate groups of the urethane prepolymer (C).

8 Claims, No Drawings

RADICAL-CURABLE HOT-MELT URETHANE RESIN COMPOSITION AND OPTICAL MOLDED BODY

TECHNICAL FIELD

The present invention relates to a radical-curable hot-melt urethane resin composition and an optical molded body that uses the radical-curable hot-melt urethane resin composition. More specifically, the present invention relates to a radical-curable hot-melt urethane resin composition having two properties of a "hot-melt property" that provides a heat-melted state during the application but achieves quick curing by cooling after the application and a "quick-curing property" achieved by irradiation with active energy rays such as infrared rays, visible light, ultraviolet rays, X rays, electron beams, α rays, β rays, γ rays, or sunlight, and also having excellent properties such as flexibility, durability (particularly hydrolysis resistance), transparency (light permeability), heat stability, yellowing resistance (non-yellowing), adhesion to a base, and productivity (quick-curing property). The present invention also relates to an optical molded body (light-guiding article such as a light-guiding film, a light-guiding sheet, a protective film, a key sheet film, an optical film, or a light-guiding plate) that uses the resin composition.

Resin compositions containing an organic solvent have been widely used as adhesives or the like. However, there have been various problems such as harmful effects on workers, danger of fire, environmental pollution, decrease in productivity due to delay of drying, and recovery loss of a solvent. Therefore, reactive hot-melt urethanes (PURHMs) have been actively investigated as energy saving/environmentally friendly solventless adhesives which are safe, can be rationalized, and do not require complicated processes such as solvent recovery.

In recent years, reactive hot-melt urethanes have been widely used as specialty products to replace solvent-based resins and water-based resins, the specialty products being, for example, adhesives for construction materials and fibers and coating agents.

The basic features of the reactive hot-melt urethanes are a "hot-melt property" in which a substance in a solid state at ordinary temperature is melted by heating into a liquid or viscous state and cohesion is generated again by cooling and a "moisture curable property" in which adhesiveness is achieved by formation of a cross-linked structure due to a reaction of moisture (water) in the air and an isocyanate group. This has been attracting attention as a method for providing solventless products from various fields and the demand has been increasing. In the present invention, moisture (water) and water vapor are assumed to have the same meaning.

A representative example of the reactive hot-melt urethanes is a urethane that uses a hot-melt urethane prepolymer having isocyanate groups at its terminals (hereinafter also referred to as "isocyanate-terminated hot-melt urethane prepolymer" or "urethane prepolymer").

However, in the case where reactive hot-melt urethanes are used in the assembly or production of articles that need to be mass-produced, such as electrical and electronic parts and automobile parts, if the line speed in the continuous production is high, the next process is started while adhesion, joining, fixing, or the like provided by the reactive hot-melt urethane are still insufficient. This causes many claims such as detachment, dropping, and damage, which are serious problems in terms of process control, quality control, and the like.

When the reactive hot-melt urethane is applied onto a base, the reactive hot-melt urethane needs to be held in a molten state by heating. Therefore, high heat stability in a molten state is required, but conventional reactive hot-melt urethanes have low heat stability (heat resistance).

A so-called "radical-curable resin composition" has been known as a resin composition that can be cured by irradiation with active energy rays such as infrared rays, visible light, ultraviolet rays, X rays, electron beams, α rays, β rays, γ rays, or sunlight. Such a radical-curable resin composition is put to practical use in various applications such as adhesives, printing ink, films, sheets, and paints for plastics, paper, and woodworking.

The radical-curable resin composition has many advantages, e.g., (1) quick curing (quick-curing property) and high productivity, (2) low-pollution and environmentally friendly resin composition containing no organic solvent, (3) substantially no adverse effects (harmful effects such as degradation, deformation, and discoloration) of heat on a base because there is no need of curing by heating, and (4) decrease in energy cost.

Resin compositions composed of, for example, an unsaturated acrylic resin, a polyester acrylate resin, a urethane acrylate resin, an epoxy acrylate resin, a polyene-polythiol addition polymerization resin, a cationic polymerization resin, or an unsaturated polyester resin have been known as the radical-curable resin composition. Among them, a urethane acrylate resin has been relatively often used in general because of its excellent quick-curing property and high degree of freedom of resin design.

An example of a resin composition that uses the urethane acrylate resin is a photo-curable resin composition that contains a urethane(meth)acrylate resin having a (meth)acryloyl group and an isocyanate group at its terminals and a photo-polymerization initiator, the urethane(meth)acrylate resin being obtained by a reaction of a polyisocyanate compound having two or more isocyanate groups per molecule, polyester polyol or polytetramethylene ether glycol, a polyhydric alcohol (trihydric or higher alcohol), and a (meth)acrylate having a hydroxyl group (e.g., refer to PTL 1 and PTL 2). Such a photo-curable resin composition is quickly cured through irradiation with light such as ultraviolet rays and forms into a film having a shine, good adhesiveness, and high crack resistance.

However, when a cured product obtained by irradiating the photo-curable resin composition obtained in PTL 1 and PTL 2 with light is used for a long time, there are practical problems of considerably low durability (particularly hydrolysis resistance) and yellowing resistance.

Furthermore, there has been known a radical-curable resin composition containing a polymerizable monomer and at least one of polymers or oligomers selected from a monofunctional urethane(meth)acrylate reactive oligomer having an alicyclic structure in its molecule, a (meth)acrylate polymer, an epoxy(meth)acrylate oligomer, a polyfunctional urethane(meth)acrylate oligomer, and an unsaturated polyester oligomer (e.g., refer to PTL 3). Such a radical-curable resin composition is molded into a product that has low shrinkage and no degradation of its surface and does not lose the transparency.

However, the radical-curable resin composition disclosed in PTL 3 has a production problem in that the curing time is excessively long and thus an excessively high energy cost is required and a performance problem in that the releasability of a molded product from a mold and the physical properties such as elongation and flexibility are considerably poor.

In recent year, light-guiding articles such as a light-guiding film, a light-guiding sheet, a protective film, a key sheet film, an optical film, a light-guiding plate, and a light-guiding fiber have been used as optical molded bodies in various applications. The performance generally required for the optical molded bodies is not only heat resistance and transparency but also appropriate flexibility in terms of ease of handling required when the optical molded bodies are subjected to a variety of processing.

In particular, a light-guiding film used for liquid crystal display devices and switching units of cellular phones, portable gaming machines, computers, and the like needs to have high transparency for efficiently guiding LED (light-emitting diode) light, heat resistance such that degradation, deformation, discoloration, and the like do not occur even under exposure to a high temperature environment for a long time, and appropriate flexibility such that a good switching response can be achieved.

As a material for such a light-guiding film, for example, there has been known an aromatic polycarbonate resin composition for light-guiding plates containing 0.01 to 0.3 parts by weight of a glycerin monoester-type releasing agent relative to 100 parts by weight of an aromatic polycarbonate resin in which the viscosity-average molecular weight is $1.0 \times 10^4$ to $1.5 \times 10^4$, the content of a low-molecular-weight component having a molecular weight of 1000 or less is 1.5% by weight or less, the total nitrogen content is 15 ppm or less, the Cl content is 100 ppm or less, and the amount of terminal OH groups is 0.1 to 30 eq/ton (e.g., refer to PTL 4). Such an aromatic polycarbonate resin composition for light-guiding plates has high heat resistance and good moldability and even a thin molded product thereof has no concerns about discoloration and has high transparency and strength.

A light-guiding plate produced from the aromatic polycarbonate resin composition disclosed in PTL 4 has relatively high transparency and heat resistance, but is excessively hard and thus has poor flexibility. Therefore, such a light-guiding plate is not easily formed into a film or sheet, which poses a problem in that the usage is quite limited.

As described above, the development of a radical-curable hot-melt urethane resin composition having well-balanced required properties such as a quick-curing property, flexibility, durability (particularly hydrolysis resistance), transparency (light permeability), heat stability, yellowing resistance (non-yellowing), and adhesion to a base and the development of an optical molded body that uses the radical-curable hot-melt urethane resin composition have been desired.

CITATION LIST

Patent Literature

PTL 1: Japanese Unexamined Patent Application Publication No. 2001-040061
PTL 2: Japanese Unexamined Patent Application Publication No. 2001-040062
PTL 3: Japanese Unexamined Patent Application Publication No. 2006-213746
PTL 4: Japanese Unexamined Patent Application Publication No. 2010-037380

SUMMARY OF INVENTION

Technical Problem

It is an object of the present invention to provide a radical-curable hot-melt urethane resin composition that has two properties of (1) a "hot-melt property" in which a substance in a solid state, a semisolid state such as a wax-like state, or a viscous state at ordinary temperature (20±15° C.) is melted by heating into a liquid or viscous state and cohesion is generated again immediately upon cooling after application onto a base and (2) a "quick-curing property" achieved by irradiation with active energy rays such as infrared rays, visible light, ultraviolet rays, X rays, electron beams, α rays, β rays, γ rays, or sunlight, and that can produce excellent properties such as appropriate flexibility (low hardness), durability (particularly hydrolysis resistance), high transparency (light permeability) for efficiently guiding LED (light-emitting diode) light, heat stability such that degradation, deformation, discoloration, and the like do not occur even under exposure to a high temperature environment for a long time, yellowing resistance (non-yellowing), adhesion to a base, and high productivity (quick-curing property). It is another object of the present invention to provide an optical molded body (light-guiding article such as a light-guiding film, a light-guiding sheet, a protective film, a key sheet film, an optical film, a light-guiding plate, or a light-guiding fiber) that uses the radical-curable hot-melt urethane resin composition.

Solution to Problem

As a result of thorough studies to solve the problems above, the inventors of the present invention have found that a radical-curable hot-melt urethane resin composition containing a hot-melt urethane (X) having a (meth)acryloyl group and a radical polymerization initiator (Y), in which the hot-melt urethane is obtained by introducing, using a (meth)acrylate compound having an active-hydrogen-containing group, a (meth)acryloyl group into an isocyanate-terminated hot-melt urethane prepolymer obtained by a reaction of a polyol and an alicyclic polyisocyanate, the polyol containing an aliphatic polycarbonate polyol, an alicyclic polycarbonate polyol, or an aliphatic polyether polyol, in an amount of more than 50 mol % and 100 mol % or less of the total number of isocyanate groups of the urethane prepolymer, has two properties of excellent hot-melt property and quick-curing property achieved by irradiation with active energy rays and the radical-curable hot-melt urethane resin composition also has excellent properties such as appropriate flexibility (low hardness), durability (particularly hydrolysis resistance), high transparency (light permeability) for efficiently guiding LED (light-emitting diode) light, heat stability such that degradation, deformation, discoloration, and the like do not occur even under exposure to a high temperature environment for a long time, yellowing resistance (non-yellowing), adhesion to a base, and high productivity (quick-curing property). Thus, the present invention has been completed.

That is, the present invention provides a radical-curable hot-melt urethane resin composition containing 100 parts by mass of a hot-melt urethane (X) having a (meth)acryloyl group and 0.5 to 5.0 parts by mass of a radical polymerization initiator (Y), wherein the hot-melt urethane (X) is obtained by introducing, using a (meth)acrylate compound (D) having an active-hydrogen-containing group, a (meth)acryloyl group into a hot-melt urethane prepolymer (C) that has isocyanate groups at its terminals and is obtained by a reaction of a polyol (A) and an alicyclic polyisocyanate (B), the polyol (A) containing an aliphatic polycarbonate polyol (a1), an alicyclic polycarbonate polyol (a2), or an aliphatic polyether polyol (a3), in an amount of more than 50 mol % and 100 mol % or less of the total number of isocyanate groups of the urethane prepolymer (C).

The present invention also provides an optical molded body produced from the radical-curable hot-melt urethane resin composition.

Advantageous Effects of Invention

The radical-curable hot-melt urethane resin composition of the present invention has two properties of a "hot-melt property" that achieves quick curing by cooling after application onto a base in a heat-melted state and a "quick-curing property" achieved by irradiation with active energy rays such as infrared rays, visible light, ultraviolet rays, X rays, electron beams, α rays, β rays, γ rays, or sunlight, and also has excellent properties such as appropriate flexibility, durability (particularly hydrolysis resistance), transparency (light permeability), heat stability, yellowing resistance (non-yellowing), adhesion to a base, and high productivity (quick-curing property). The radical-curable hot-melt urethane resin composition is useful for optical molded bodies such as a light-guiding film, a light-guiding sheet, a protective film, a key sheet film, an optical film, a light-guiding plate, and a light-guiding fiber or in various applications of light-guiding articles such as an adhesive for films, sheets, or fibers, a tackiness agent, and a coating agent.

DESCRIPTION OF EMBODIMENTS

The present invention will now be described in detail.
<<Radical-Curable Hot-Melt Urethane Resin Composition>>
A radical-curable hot-melt urethane resin composition of the present invention includes a hot-melt urethane (X) having a (meth)acryloyl group (hereinafter, referred to as hot-melt urethane (X)) and a radical polymerization initiator (Y) in particular amounts.

The hot-melt urethane (X) used in the present invention is obtained by introducing, using a (meth)acrylate compound (D) having an active-hydrogen-containing group, a (meth)acryloyl group into an isocyanate-terminated hot-melt urethane prepolymer (C) obtained by a reaction of a polyol (A) and an alicyclic polyisocyanate (B) in an amount of more than 50 mol % and 100 mol % or less, preferably 60 to 100 mol %, and more preferably 80 to 100 mol % of the total number of isocyanate groups of the isocyanate-terminated hot-melt urethane prepolymer (C).

In the present invention, by using the hot-melt urethane (X) within the above-described amount, excellent properties such as appropriate flexibility, a quick-curing property, a shape-retaining property after application onto a base, mechanical strength, durability (particularly hydrolysis resistance), and adhesion to a base (particularly adhesion to metal) can be produced.

The radical polymerization initiator (Y) used in the present invention may be a publicly known initiator. Examples of the radical polymerization initiator (Y) include photopolymerization initiators and peroxides. Photopolymerization initiators are preferred in terms of productivity, which will be described later.
<<Polyol (A)>>
In the present invention, a polyol that does not have an aromatic ring structure is used as the polyol (A) because yellowing resistance and transparency can be improved. The polyol (A) is preferably an aliphatic polycarbonate polyol, an alicyclic polycarbonate polyol, an aliphatic polyether polyol, an alicyclic polyester polyol, or an aliphatic polyester polyol; and more preferably an aliphatic polycarbonate polyol, an alicyclic polycarbonate polyol, an aliphatic polyether polyol, or an alicyclic polyester polyol.

An example of an aliphatic polycarbonate polyol (a1) or an alicyclic polycarbonate polyol (a2) that can be used as the polyol (A) is a polyol obtained by causing a reaction of a carbonic acid ester and/or phosgene and a polyol described below.

Examples of the carbonic acid ester include methyl carbonate, dimethyl carbonate, ethyl carbonate, diethyl carbonate, cyclocarbonate, and diphenyl carbonate.

Examples of the polyol that can react with the carbonic acid ester or phosgene include dihydroxy compounds having a relatively low molecular weight, such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, 1,4-cyclohexanedimethanol, hydroquinone, resorcin, bisphenol A, bisphenol F, and 4,4'-biphenol; polyether polyols such as polyethylene glycol, polypropylene glycol, and polytetramethylene glycol; and polyester polyols such as polyhexamethylene adipate, polyhexamethylene succinate, and polycaprolactone.

Among them, the aliphatic polycarbonate polyol (a1) or alicyclic polycarbonate polyol (a2) is preferably, for example, a polyol obtained by causing a reaction of a dialkyl carbonate and a polyol including at least one selected from 1,4-butanediol, 1,5-pentanediol, and 1,6-hexanediol because the transparency of optical molded bodies can be further improved.

The aliphatic polycarbonate polyol (a1) or alicyclic polycarbonate polyol (a2) is preferably a polycarbonate polyol having an alicyclic structure because high transparency can be maintained and initial cohesion can be improved. The alicyclic polycarbonate polyol is preferably, for example, a polyol obtained by causing a reaction of a dialkyl carbonate and a polyol including at least one selected from cyclohexanedimethanol and the derivatives thereof.

The number-average molecular weight (Mn) of the aliphatic polycarbonate polyol (a1) or alicyclic polycarbonate polyol (a2) is preferably 500 to 3000 and more preferably 1000 to 2000. When the number-average molecular weight Mn of the aliphatic polycarbonate polyol (a1) or alicyclic polycarbonate polyol (a2) is within the above-described range, excellent properties such as a shape-retaining property, coating workability, initial cohesion, and the mixing property with other components, e.g., an aliphatic polyether polyol (a3) or an alicyclic polyester polyol (a4) described below can be provided to the radical-curable hot-melt urethane resin composition to be produced.

The number-average molecular weight (Mn) mentioned in the present invention is a value measured under the following conditions by a gel permeation chromatography method (GPC method) that uses polystyrene as a molecular weight standard.

[Measurement Method of Number-Average Molecular Weight (Mn)]
The number-average molecular weight (Mn) mentioned in the present invention is measured under the following conditions by a gel permeation chromatography method (GPC method) in terms of polystyrene equivalent.

Resin sample solution; 0.4% tetrahydrofuran (THF) solution

Model number of measurement equipment; HLC-8220GPC (manufactured by TOSOH CORPORATION)

Column; TSKgel (manufactured by TOSOH CORPORATION)

Eluent; tetrahydrofuran (THF)

An aliphatic polyether polyol (a3) that can be used as the polyol (A) will now be described.

Examples of the aliphatic polyether polyol (a3) include a product obtained by addition polymerization of one or more alkylene oxides such as ethylene oxide, propylene oxide, and butylene oxide to a compound having two or more active hydrogens; polytetramethylene glycol (e.g., trade name; PTMG manufactured by Mitsubishi Chemical Corporation) obtained by ring-opening polymerization of tetrahydrofuran; a polytetramethylene glycol derivative obtained by copolymerization of tetrahydrofuran and an alkyl-substituted tetrahydrofuran; and a polytetramethylene glycol derivative (e.g., trade name; PTXG manufactured by Asahi Kasei Fibers Corp.) obtained by copolymerization of neopentyl glycol and tetrahydrofuran. Among them, polytetramethylene glycol (PTMG) and a polytetramethylene glycol derivative (PTXG) are preferred because the transparency of optical molded bodies, flexibility, durability (particularly hydrolysis resistance), and the like can be further improved.

The aliphatic polyether polyol (a3) may be a polyether polyol having an alicyclic structure.

Examples of the compound having two or more active hydrogens include water, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, glycerin, diglycerin, trimethylolpropane, ditrimethylolpropane, tritrimethylolpropane, 1,2,6-hexanetriol, triethanolamine, triisopropanolamine, pentaerythritol, dipentaerythritol, sorbitol, saccharose, ethylenediamine, N-ethyldiethylenetriamine, 1,2-diaminopropane, 1,3-diaminopropane, 1,2-diaminobutane, 1,3-diaminobutane, 1,4-diaminobutane, diethylenetriamine, phosphoric acid, and acidic phosphoric acid esters. They may be used alone or in combination of two or more.

Examples of the aliphatic polyester polyol that can be used as the polyol (A) include an aliphatic polyester polyol obtained by esterification of a low-molecular-weight polyol and polycarboxylic acid, a polyester obtained by ring-opening polymerization of cyclic ester compounds such as ε-caprolactone and γ-valerolactone, and a copolymerization polyester of the foregoing.

Examples of the low-molecular-weight polyol include aliphatic polyols such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, glycerin, trimethylolpropane, ditrimethylolpropane, trimethylolpropane, and pentaerythritol; and alicyclic polyols such as 1,4-cyclohexanedimethanol and hydrogenated bisphenol A.

Examples of the polycarboxylic acid include aliphatic polycarboxylic acids such as succinic acid, adipic acid, suberic acid, azelaic acid, sebacic acid, dodecanedicarboxylic acid, and dimer acid; alicyclic polycarboxylic acids such as 1,4-cyclohexanedicarboxylic acid and cyclohexanetricarboxylic acid; and anhydrides and ester derivatives of the foregoing. They may be used alone or in combination of two or more.

Among them, an alicyclic polyester polyol, an aliphatic polyester polyol obtained by ring-opening polymerization of ε-caprolactone, and an aliphatic polyester polyol obtained by esterification of 1,4-butanediol and adipic acid are preferred because the transparency of optical molded bodies can be improved.

The number-average molecular weight Mn of the aliphatic polyether polyol (a3) is preferably 500 to 3000 and more preferably 1000 to 3000. When the number-average molecular weight Mn of the polyol (a2) is within the above-described range, excellent properties such as a shape-retaining property, coating workability, initial cohesion, and the mixing property with other components, e.g., the polyol (a1) and the polyol (a3) are achieved.

In the present invention, the total content of the aliphatic polycarbonate polyol (a1), the alicyclic polycarbonate polyol (a2), and the aliphatic polyether polyol (a3) is preferably 20 parts by mass or more and more preferably 50 parts by mass or more relative to 100 parts by mass in total of the polyol (A). When the polyol (A) includes the polyols (a1) to (a3) within the above-described content, a radical-curable hot-melt urethane resin composition having excellent properties such as workability, initial cohesion, flexibility, and durability (hydrolysis resistance) can be produced.

In addition to the aliphatic polycarbonate polyol (a1), the alicyclic polycarbonate polyol (a2), and the aliphatic polyether polyol (a3), other polyols can be used as the polyol (A).

Examples of the other polyols include polyester polyols and acrylic polyols.

Among the other polyols, an alicyclic polyester polyol (a4), which is one of the polyester polyols, is particularly preferred. When the radical-curable hot-melt urethane resin composition is produced by using, as the polyol (A), the alicyclic polyester polyol (a4) together with the polyols (a1) to (a3), excellent properties such as a hot-melt property that achieves quick curing by cooling after application onto a base and high transparency (light permeability) for efficiently guiding LED (light-emitting diode) light or the like can be produced.

Examples of the alicyclic polyester polyol (a4) include a product obtained by a condensation reaction of an aliphatic dicarboxylic acid and an alicyclic diol and a product obtained by a condensation reaction of an alicyclic dicarboxylic acid and an aliphatic diol. The polyol (a4) is more preferably used together as a raw material for synthesizing the polyol (A) because the compatibility with each polyol component can be further improved, the initial cohesion of the produced radical-curable hot-melt urethane resin composition to a base can be further improved, and the flexibility and durability (particularly hydrolysis resistance) can be further improved. Among the polyols (a4), a polyol having a cyclohexane ring is more preferably used because the above-described effects can be further improved.

The combination between the aliphatic dicarboxylic acid and alicyclic diol or the combination between the alicyclic dicarboxylic acid and aliphatic diol, the dicarboxylic acid and diol being used in the synthesis of the alicyclic polyester polyol (a4), may be suitably selected in consideration of, for example, the compatibility with each polyol component or the intended performance of the radical-curable hot-melt urethane resin composition.

Examples of the aliphatic dicarboxylic acid include oxalic acid, succinic acid, adipic acid, glutaric acid, pimelic acid, suberic acid, azelaic acid, sebacic acid, dodecanedicarboxylic acid, maleic acid, and fumaric acid. Among them, a dicarboxylic acid having 6 or less carbon atoms is preferred and succinic acid and adipic acid are more preferred because properties such as the transparency and initial cohesion of an intended resin composition can be further improved.

The alicyclic diol is not particularly limited, but 1,4-cyclohexanedimethanol (CHDM) and the derivatives thereof are preferred because high transparency can be achieved.

Examples of the alicyclic dicarboxylic acid include hexahydrophthalic acid and/or the isomers thereof, 1,3-cyclopentanedicarboxylic acid, 1,4-cyclohexanedicarboxylic acid, 1,3-cyclohexanedicarboxylic acid, and 1,2-cyclohexanedicarboxylic acid. Among them, hexahydrophthalic acid and/or the isomers thereof are preferred in terms of transparency.

Examples of the aliphatic diol include ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, and 2-methyl-1,8-octanediol. Among them, ethylene glycol and 1,4-butanediol, both of which have 2 to 4 carbon atoms, are preferred in terms of transparency.

Instead of the aliphatic dicarboxylic acid and the alicyclic dicarboxylic acid, various carboxylic acid derivatives such as lower alkyl esters, e.g., methyl ester compounds of the aliphatic or alicyclic dicarboxylic acid, acid anhydrides, and acid halides may be used.

The number-average molecular weight Mn of the alicyclic polyester polyol (a4) is preferably 500 to 5000 and more preferably 1000 to 3000. When the number-average molecular weight Mn of the polyol (a4) is within the above-described range, a radical-curable hot-melt urethane resin composition which has excellent initial cohesion and can be favorably formed into a cured product such as an optical molded body having appropriate flexibility according to the purpose can be produced.

As described above, in the polyol (A) of the radical-curable hot-melt urethane resin composition of the present invention, the alicyclic polyester polyol (a4) is preferably used as a "compatibilizer" together with a polyol including the aliphatic polycarbonate polyol (a1), alicyclic polycarbonate polyol (a2), or aliphatic polyether polyol (a3) because a more uniform compatible system can be formed, resulting in high flexibility and high mechanical strength.

The content of the polyol (a1) or (a2) is preferably 20 to 95 parts by mass and more preferably 50 to 95 parts by mass relative to 100 parts by mass in total of the polyol (A). The content of the polyol (a3) is preferably 20 to 95 parts by mass and more preferably 50 to 95 parts by mass relative to 100 parts by mass in total of the polyol (A). The content of the polyol (a4) is preferably 10 to 50 parts by mass and more preferably 10 to 30 parts by mass relative to 100 parts by mass in total of the polyol (A). The polyol (a4) is preferably contained within the above-described range because the compatibility can be further improved, good initial cohesion of a radical-curable hot-melt urethane resin composition to a base, adhesion, and transparency can be more stably maintained, and appropriate flexibility and high durability (particularly hydrolysis resistance) can be further improved.

In conventional hot-melt urethane resin compositions, a trifunctional or higher functional polyhydric alcohol such as trimethylolpropane or polypropylene glycol has been used as a raw material for synthesizing polyols in order to improve the durability (hydrolysis resistance) and strength retention. However, there has been a problem in that a hot-melt urethane resin composition obtained by such a method has poor heat stability. Therefore, in the radical-curable hot-melt urethane resin composition of the present invention, high heat stability is also achieved by using a specific polyol (A) without using the trifunctional or higher functional polyhydric alcohol at all.

The alicyclic polyisocyanate (B) used together with the polyol (A) in the synthesis of the isocyanate-terminated hot-melt urethane prepolymer (C) will now be described.

The alicyclic polyisocyanate (B) may be a polyisocyanate having an aliphatic ring structure. Examples of the alicyclic polyisocyanate (B) include isophorone diisocyanate, 1,3-bis(isocyanatomethyl)cyclohexane, 4,4'-dicyclohexylmethane diisocyanate, 2,4- and/or 2,6-methylcyclohexane diisocyanate, cyclohexylene diisocyanate, methylcyclohexylene diisocyanate, bis(2-isocyanatoethyl)-4-cyclohexylene-1,2-dicarboxylate, 2,5- and/or 2,6-norbornane diisocyanate, dimer acid diisocyanate, and bicycloheptane triisocyanate. They may be used alone or in combination of two or more. Among them, 4,4'-dicyclohexylmethane diisocyanate (HMDI), isophorone diisocyanate (IPDI), and 1,3-bis(isocyanatomethyl)cyclohexane (BICH) are preferred because they have high reactivity with the polyol (A) and moisture (water) and an optical molded body having excellent properties such as heat resistance and transparency (light permeability) can be produced. Furthermore, a polyisocyanate having an aromatic ring structure may be used together as long as the advantages of the present invention are not impaired.

In the present invention, the polyol (A) and the alicyclic polyisocyanate (B) are caused to react with each other to synthesize the isocyanate-terminated hot-melt urethane prepolymer (C) (hereinafter abbreviated as "urethane prepolymer (C)"), which is a urethane prepolymer having isocyanate groups at the terminals of its molecule. The synthesis method is not particularly limited and a publicly known method can be employed.

An example of the synthesis method of the urethane prepolymer (C) is described below. The polyol (A), that is, a polyol mixture including the aliphatic polycarbonate polyol (a1), the alicyclic polycarbonate polyol (a2), or the aliphatic polyether polyol (a3) and optionally the alicyclic polyester polyol (a4) is charged into a reaction vessel and then heated under normal pressure or reduced pressure to remove the moisture in advance. Subsequently, a required amount of alicyclic polyisocyanate (B) is charged into the polyol mixture by an appropriate process such as dropwise addition, multiple addition, single addition, or continuous addition and mixed. Then, a reaction is caused to proceed until the content (%) of isocyanate groups reaches a substantially constant value.

In the production of the urethane prepolymer (C), the reaction is generally caused to proceed without using a solvent, but may be caused to proceed in an organic solvent. When the reaction is caused to proceed in an organic solvent, an organic solvent that does not impair the normal reaction and high quality needs to be selected. Examples of the organic solvent include ester-based solvents such as methyl acetate, ethyl acetate, propyl acetate, and butyl acetate; ketone-based solvents such as acetone, methyl ethyl ketone, methyl butyl ketone, and cyclohexanone; ether ester-based solvents such as methyl cellosolve acetate and butyl cellosolve acetate; aromatic hydrocarbon-based solvents such as toluene and xylene; and amide-based solvents such as dimethylformamide and dimethylacetamide. They may be used alone or in combination of two or more. The amount of the organic solvent used is not particularly limited as long as the reaction is not impaired. Note that the organic solvent used in the reaction is removed by an appropriate method such as heating under reduced pressure or drying under normal pressure during or after the reaction.

The melt viscosity of the urethane prepolymer (C) is preferably 500 mPa·s or more (measurement temperature: 100° C., hereinafter the measurement temperature is omitted) when the resin composition is formed into an optical molded body such as a light-guiding plate or a light-guiding fiber. The melt viscosity is preferably 500 to 5000 mPa·s and more preferably 500 to 4300 mPa·s when the resin composition is formed into a film-shaped optical molded body such as a protective film, a key sheet film, an optical film, a light-guiding film, or a light-guiding sheet. When the melt viscosity of the urethane prepolymer (C) is within the above-described range, an intended resin composition is molded into a film or a sheet without causing cissing and excellent surface smoothness can be achieved.

The melt viscosity in the present invention is a viscosity measured with a cone-plate viscometer (manufactured by ICI) at a measurement temperature of 100° C. unless otherwise specified.

The equivalent weight of an isocyanate group of the urethane prepolymer (C) is not particularly limited when used as an optical molded body such as a light-guiding plate or a light-guiding fiber, but is preferably 500 to 3000 and more preferably 500 to 2000 when used as a film-shaped optical molded body such as a protective film, a key sheet film, an optical film, a light-guiding film, or a light-guiding sheet. When the equivalent weight of an isocyanate group of the urethane prepolymer (C) is within the above-described range, high transparency and appropriate flexibility can be achieved when used as a film or sheet, and cissing is not caused in the application onto a base and thus excellent surface smoothness is achieved.

The equivalent weight of an isocyanate group mentioned in the present invention is obtained by dividing the total weight of the polyol (A) and the alicyclic polyisocyanate (B) by a value obtained by subtracting the equivalent derived from the polyol (A) from the equivalent derived from the alicyclic polyisocyanate (B).

The method for producing the urethane prepolymer (C) by causing a reaction of the polyol (A) and the alicyclic polyisocyanate (B) without using a solvent can be exemplified below.

The mixing ratio of the polyol (A) and alicyclic polyisocyanate (B) used when the urethane prepolymer (C) is produced is set so that the equivalent ratio (hereinafter referred to as [NCO/OH equivalent ratio]) of an isocyanate group of the alicyclic polyisocyanate (B) and a hydroxyl group of the polyol (A) is preferably 1.1 to 20.0, more preferably 1.1 to 13.0, further preferably 1.1 to 5.0, and particularly preferably 1.5 to 3.0. When the [NCO/OH equivalent ratio] is within the above-described range, a radical-curable hot-melt urethane resin composition having a melt viscosity suitable for the application onto a base and excellent shape-retaining property after curing by cooling can be produced.

The reaction conditions (e.g., temperature and time) under which the urethane prepolymer (C) is produced are not particularly limited and may be suitably set in consideration of conditions such as safety, quality, and cost. For example, the reaction temperature is preferably 70° C. to 120° C. and the reaction time is preferably 30 minutes to 5 hours.

The softening temperature of the urethane prepolymer (C) is preferably 30° C. to 120° C. and more preferably 40° C. to 100° C. When the softening temperature of the urethane prepolymer (C) is within the above-described range, the curing time after application is shortened, the initial cohesion is easily generated, and excellent initial adhesiveness is achieved, which are preferable.

The softening temperature mentioned in the present invention is a value measured in conformity with Japanese Industrial Standards (hereinafter referred to as JIS) K 2207.

Examples of the method for adjusting the softening temperature of the urethane prepolymer (C) to be in an appropriate temperature range include (1) the adjustment based on the molecular weight of a urethane prepolymer (e.g., the adjustment of the molar ratio of a polyol and a polyisocyanate, the use of a high-molecular-weight polyol, and the use of a polymer), (2) the adjustment based on the crystallinity of an ethylene chain in a polyester polyol, (3) the adjustment based on the molecular structures of a polyol and a polyisocyanate, and (4) the adjustment based on a urethane bond. These adjustments are not particularly limited and may be suitably selected.

When the urethane prepolymer (C) is produced, a tertiary amine catalyst or an organic metal catalyst may be optionally used as a catalyst, and such a catalyst is not particularly limited.

Subsequently, a hot-melt urethane (X) is obtained by introducing a (meth)acryloyl group into an isocyanate group of the urethane prepolymer (C) using the (meth)acrylate compound (D) having an active-hydrogen-containing group (hereinafter referred to as (meth)acrylate compound (D)). The hot-melt urethane (X) is mixed with a radical polymerization initiator (Y) to obtain a radical-curable hot-melt urethane resin composition of the present invention.

The hot-melt urethane (X) is obtained by introducing a (meth)acryloyl group through a reaction of an isocyanate group of the urethane prepolymer (C) and the (meth)acrylate compound (D) having an active-hydrogen-containing group.

Herein, the hot-melt urethane (X) is obtained by introducing a (meth)acryloyl group in an amount of more than 50 mol % and 100 mol % or less, preferably 60 to 100 mol %, and more preferably 80 to 100 mol % of the total number of isocyanate groups of the urethane prepolymer (C). By using the hot-melt urethane (X) obtained by introducing a (meth)acryloyl group within the above-described range, appropriate flexibility, an excellent quick-curing property, a shape-retaining property after application onto a base, mechanical strength, durability (particularly hydrolysis resistance), adhesion to a base (particularly adhesion to metal), and the like can be produced.

The "active-hydrogen-containing group" mentioned in the present invention means a functional group having reactivity with an isocyanate group. The active-hydrogen-containing group is a group having active hydrogens, such as a hydroxyl group, an amino group, a carboxyl group, or a mercapto group, preferably a hydroxyl group or an amino group, and more preferably a hydroxyl group.

Specific examples of the (meth)acrylate compound (D) having an active-hydrogen-containing group include (meth)acrylate compounds having a hydroxyl group such as 2-hydroxyethyl(meth)acrylate, 2-hydroxypropyl(meth)acrylate, 3-hydroxypropyl(meth)acrylate, 4-hydroxybutyl(meth)acrylate, 2-hydroxy-3-phenoxypropyl(meth)acrylate, pentaerythritol tri(meth)acrylate, butanediol mono(meth)acrylate, caprolactone-modified products of 2-hydroxyethyl(meth)acrylate, and glycidol di(meth)acrylate; and (meth)acrylate compounds having an amino group such as dimethylaminoethyl(meth)acrylate and diethylaminoethyl(meth)acrylate. Among them, 2-hydroxyethyl acrylate (HEA) is preferred because the mechanical strength is increased and an excellent quick-curing property produced through irradiation with active energy rays such as infrared rays, visible light, ultraviolet rays, X rays, electron beams, α rays, β rays, γ rays, or sunlight is achieved. They may be used alone or in combination of two or more.

In the present invention, the "(meth)acrylate" means one or both of methacrylate and acrylate. The "(meth)acryloyl group" means one or both of methacryloyl group and acryloyl group. The "(meth)acrylic acid" means one or both of methacrylic acid and acrylic acid.

The amount of the (meth)acrylate compound (D) used is preferably 5.0 to 20.0 parts by mass and more preferably 5.0 to 15.0 parts by mass relative to 100 parts by mass of the urethane prepolymer (C).

When the urethane prepolymer (C) and the (meth)acrylate compound (D) are caused to react with each other, a urethane-forming catalyst may be optionally used. The urethane-forming catalyst can be suitably added at any stage of the urethane-forming reaction.

The urethane-forming reaction is preferably continued until the content (%) of isocyanate groups reaches a substantially constant value.

The urethane-forming catalyst is not particularly limited, and a publicly known catalyst can be used. Examples of the urethane-forming catalyst include nitrogen-containing compounds such as triethylamine, triethylenediamine, and N-methylmorpholine; organic metal salts such as potassium acetate, zinc stearate, and stannous octylate; and organic metal compounds such as dibutyltin dilaurate.

The amount of the urethane-forming catalyst used is not particularly limited as long as the urethane-forming catalyst does not adversely affect the safety during the reaction and the stability and quality of intermediates or products.

The melt viscosity of the hot-melt urethane (X) into which the (meth)acryloyl group has been introduced is preferably 500 mPa·s or more (measurement temperature: 100° C., hereinafter the measurement temperature is omitted) when the resin composition is used as an optical molded body such as a light-guiding plate or a light-guiding fiber. The melt viscosity of the hot-melt urethane (X) is preferably 500 to 5000 mPa·s and more preferably 500 to 4300 mPa·s when the resin composition is used as a film-shaped optical molded body such as a protective film, a key sheet film, an optical film, a light-guiding film, or a light-guiding sheet. When the melt viscosity of the hot-melt urethane (X) is within the above-described range, cissing is not caused in the molding of an intended resin composition into a film or sheet and thus excellent surface smoothness can be achieved.

In the radical-curable hot-melt urethane resin composition of the present invention, a radical-curable reaction caused through irradiation with active energy rays between a double bond and an isocyanate group of the hot-melt urethane (X) into which a (meth)acryloyl group has been introduced and a moisture (water) curable reaction of the isocyanate group occur together. Therefore, excellent properties such as a shape-retaining property after application onto a base, flexibility, mechanical strength, durability (particularly hydrolysis resistance), adhesion to a base, and a quick-curing property can be produced.

The radical-curable hot-melt urethane resin composition of the present invention can be produced by mixing a certain amount of radical polymerization initiator (Y) with the hot-melt urethane (X).

The radical polymerization initiator (Y) has a property of starting a curing reaction in which the radical polymerization initiator itself or the decomposition product thereof reacts with the active sites of reactive oligomers and (meth)acrylate monomers by the action of light, heat, or a catalyst.

The mixing amount of the radical polymerization initiator (Y) is preferably 0.5 to 5.0 parts by mass and more preferably 1.0 to 3.0 parts by mass relative to 100 parts by mass of the urethane prepolymer (C). When the mixing amount of the radical polymerization initiator (Y) is within the above-described range, the curing properties of the resin composition can be suitably adjusted in accordance with the processing conditions. As a result, a radical-curable hot-melt urethane resin composition having excellent adhesion and shape-retaining property after application onto a base can be produced. If the content of the radical polymerization initiator (Y) is less than 0.5 parts by mass, the workability degrades due to excessively long curing time. If the content is more than 5.0 parts by mass, the curing reaction occurs excessively rapidly. In both cases, problems may arise.

The radical polymerization initiator (Y) is preferably added after the (meth)acrylate compound (D) is caused to react with the urethane prepolymer (C) in an amount of more than 50 mol % and 100 mol % or less of the total number of terminal NCO groups of the urethane prepolymer (C).

The reaction conditions (e.g., temperature and time) are not particularly limited and may be suitably set in consideration of conditions such as safety, quality, and cost. For example, the reaction temperature is preferably 80° C. to 120° C. and the mixing time is preferably 30 minutes to 2 hours.

A publicly known initiator can be used as the radical polymerization initiator (Y). Examples of the radical polymerization initiator (Y) include photopolymerization initiators and peroxides, and photopolymerization initiators are preferred in terms of productivity or the like.

Non-limiting examples of the photopolymerization initiator include publicly known initiators such as alkylphenone photopolymerization initiators, e.g., benzophenone, camphorquinone photopolymerization initiators, acylphosphine oxide photopolymerization initiators, and titanocene photopolymerization initiators. Examples of commercially available photopolymerization initiators (hereinafter a trademark is stated) include benzophenone, 4,4-bis(diethylamino)benzophenone, 2,4,6-trimethylbenzophenone, methylorthobenzoyl benzoate, 4-phenylbenzophenone, t-butylanthraquinone, 2-ethylanthraquinone; thioxanthones such as 2,4-diethylthioxanthone, isopropylthioxanthone, and 2,4-dichlorothioxanthone; acetophenones such as diethoxyacetophenone, 2-hydroxy-2-methyl-1-phenylpropan-1-one (e.g., DAROCUR 1173 manufactured by Ciba Specialty Chemicals), benzyldimethylketal, 1-hydroxycyclohexyl phenyl ketone (e.g., IRGACURE 184 manufactured by Ciba Specialty Chemicals), 1-[4-(2-hydroxyethoxy)-phenyl]-2-hydroxy-2-methyl-1-propan-1-one (e.g., IRGACURE 2959 manufactured by Ciba Specialty Chemicals), 2-methyl-2-morpholino(4-thiomethylphenyl)propan-1-one (IRGACURE 907 manufactured by Ciba Specialty Chemicals), and 2-benzyl-2-dimethylamino-1-(4-morpholinophenyl)-butanone; benzoin ethers such as benzoin methyl ether, benzoin ethyl ether, benzoin isopropyl ether, and benzoin isobutyl ether; acylphosphine oxides such as 2,4,6-trimethylbenzoyl-diphenylphosphine oxide, bis(2,6-dimethoxybenzoyl)-2,4,4-trimethylpentylphosphine oxide, and bis(2,4,6-trimethylbenzoyl)-phenylphosphine oxide; and methylbenzoyl formate (e.g., VICURE 55 manufactured by Stauffer Chemical Company), 1,7-bisacridinylheptane, 9-phenylacridine, QUANTACURE (manufactured by International Bio-Synthetics), KAYACURE MBP (manufactured by Nippon Kayaku Co., Ltd.), ESACURE BO (manufactured by Fratelli Lamberti), Trigonal 14 (manufactured by Akzo), IRGACURE (manufactured by Ciba Specialty Chemicals), DAROCUR (manufactured by Ciba Specialty Chemicals), SPEEDCURE (manufactured by Ciba Specialty Chemicals), and a mixture (manufactured by Eastman Chemical Company) of DAROCUR 1173 and DAROCUR Fi-4. They may be used alone or in combination of two or more. Among them, photopolymerization initiators such as IRGACURE 184 and IRGACURE 651 are preferred because excellent curing properties can be provided through irradiation with active energy rays such as ultraviolet rays.

Examples of the peroxides include publicly known peroxides such as ketone peroxide, peroxyketal, hydroperoxide, dialkyl peroxide, diacyl peroxide, peroxydicarbonate, cumen hydroperoxide, and peroxyester. They may be used alone or in combination of two or more. Among them, peroxyester and peroxydicarbonate are preferred and peroxydicarbonate is particularly preferred when cured at a high temperature of 80° C. to 120° C. The peroxydicarbonate is, for example, di(4-t-butylcyclohexyl) peroxydicarbonate, and a commercially available product of the peroxydicarbonate is, for example, PEROYL TCP (manufactured by NOF CORPORATION). Among them, PEROYL TCP is preferred because excellent curing properties can be provided through irradiation with active energy rays such as ultraviolet rays.

A publicly known photosensitizer may be optionally added to the radical-curable hot-melt urethane resin composition of the present invention. Examples of the photosensitizer include ethanolamine, diethanolamine, triethanolamine, N-methyldiethanolamine, methyl 4-dimethylaminobenzoate, ethyl 4-dimethylaminobenzoate, amyl 4-dimethylaminobenzoate, and 4-dimethylaminoacetophenone. These photosensitizers may also be used alone or in combination of two or more.

The radical-curable hot-melt urethane resin composition of the present invention may further contain a publicly known polyfunctional (meth)acrylate compound.

Since the polyfunctional (meth)acrylate compound can contribute to the formation of a cross-linked structure due to the double bond in its molecule, the curing rate of the hot-melt urethane resin composition and the cross-linking density after the curing are further improved. As a result, high durability and fuzz resistance can be provided to films and sheets produced.

The "polyfunctional" mentioned in the present invention means that two or more polymerizable double bonds are included in a molecule and preferably two to four polymerizable double bonds are included in a molecule.

The amount of the polyfunctional (meth)acrylate compound added is preferably 5 to 30 parts by mass and more preferably 5 to 10 parts by mass relative to 100 parts by mass of the radical-curable hot-melt urethane resin composition. When the amount of the polyfunctional (meth)acrylate compound added is within the above-described range, the melt viscosity can be easily adjusted to a target value and the durability and fuzz resistance can be further improved, which are preferable.

Examples of the polyfunctional (meth)acrylate compound include (meth)acrylates such as polyethylene glycol di(meth)acrylate, tripropylene glycol di(meth)acrylate, neopentyl glycol hydroxypivalate di(meth)acrylate, ditrimethylolpropane tetra(meth)acrylate, neopentyl glycol di(meth)acrylate, 1,6-hexanediol di(meth)acrylate, trimethylolpropane tri(meth)acrylate, pentaerythritol tri(meth)acrylate, and pentaerythritol tetra(meth)acrylate; and (meth)acrylate esters of sugar alcohols, such as sorbitol. They may be used alone or in combination of two or more.

In the present invention, compounds obtained by further adding, for example, an alkylene oxide, an aliphatic ester, or caprolactone to the polyfunctional (meth)acrylate compound can be used. Examples of the alkylene oxide adduct include an ethylene oxide adduct and a propylene oxide adduct.

For example, diacrylates having acrylate groups at the both terminals of a polyethylene glycol skeleton, trimethylolpropane triacrylate, pentaerythritol tetraacrylate, and the ethylene oxide adducts and propylene oxide adducts of the foregoing are preferred as the polyfunctional (meth)acrylate compound because excellent curing properties and high productivity can be achieved through irradiation with active energy rays, in particular, irradiation with ultraviolet rays, which is described below.

For example, a foam stabilizer, an antioxidant, a defoaming agent, an ultraviolet absorber, an abrasive grain, an antioxidant, an antifoaming agent, a leveling agent, a polymerization inhibitor, a humectant (viscosity-reducing agent), a thixotropic agent, a filler, a pigment, a dye, a coloring agent, a thickener, a surfactant, a flame retardant, a plasticizer, a lubricant, an antistatic agent, a heat stabilizer, a tackiness imparting agent, a curing catalyst, a stabilizer, a fluorescent brightening agent, a silane coupling agent, and a wax can be further added as additives. If necessary, a publicly known thermoplastic resin or thermosetting resin can be suitably selected and used as a blending resin as long as the object of the present invention is not impaired. Note that the additives are merely examples and the types and amounts of the additives used are not particularly limited as long as the object of the present invention is not impaired. These additives may be added at any stage of production.

Examples of the tackiness imparting agent that can be used include a rosin resin, a rosin ester resin, a hydrogenated rosin ester resin, a terpene resin, a terpene phenolic resin, a hydrogenated terpene resin; and petroleum resins such as a $C_5$ aliphatic resin, a $C_9$ aromatic resin, and a $C_5$ and $C_9$ copolymer resin.

Examples of the plasticizer that can be used include dibutyl phthalate, dioctyl phthalate, dicyclohexyl phthalate, diisooctyl phthalate, diisodecyl phthalate, dibenzyl phthalate, butylbenzyl phthalate, trioctyl phosphate, epoxy-based plasticizers, toluene-sulfonamide, chloroparaffin, adipic acid esters, and castor oil. Furthermore, methyl acid phosphate (AP-1) and an acrylic surface-controlling agent (BYK-361N) are exemplified.

Examples of the stabilizer that can be used include hindered phenol compounds, benzotriazole compounds, and hindered amine compounds.

Examples of the filler that can be used include silicic acid derivatives, talc, metal powder, calcium carbonate, clay, and carbon black.

Examples of the ultraviolet absorber include benzotriazole compounds such as methylhydroxyphenylbenzotriazole, butylmethylhydroxyphenylbenzotriazole, and dibutylhydroxyphenylbenzotriazole; and hindered amine compounds such as bis(tetramethylpiperidyl) sebacate and bis(pentamethylpiperidyl) sebacate.

Examples of the "active energy rays" used when a cured film is produced by curing a film of the radical-curable hot-melt resin composition of the present invention include sunlight, infrared rays, visible light, ultraviolet rays, X rays, electron beams, α rays, β rays, γ rays, and sunlight. In terms of the cost of equipment and productivity, infrared rays, visible light, ultraviolet rays, electron beams, and sunlight are preferred and ultraviolet rays are further preferred.

Non-limiting examples of a light source that can be used include an electron beam irradiation apparatus, a mercury lamp (ultra-high pressure, high pressure, medium pressure, low pressure), a metal halide lamp, a tungsten lamp, an Ar laser, a He—Cd laser, a solid-state laser, a xenon lamp, a high-frequency induction mercury lamp, a hydrogen lamp, a deuterium lamp, a halogen lamp, a carbon arc lamp, a fluorescent lamp, and sunlight.

The irradiation intensity of the active energy rays is dependent on the types of active energy rays used and is not particularly limited. For example, in the case where curing is performed by irradiation with electron beams, the irradiation intensity is preferably 1 to 20 Mrad. In the case where irradiation with ultraviolet rays is performed, the irradiation intensity is not particularly limited, but is preferably 50 to 1500 mJ/cm$^2$.

A method for producing an optical molded body by molding the radical-curable hot-melt urethane resin composition is described below. For example, there are a method in which the resin composition is applied onto the surface of a release base by an appropriate method, e.g., a slit coater method such as a curtain flow coater method or a die coater method, a knife coater method, or a roll coater method, optionally dried, and then cured by heating and an injection press molding method in which a resin is compressed in a die.

The curing conditions after the application are dependent on the type of radical polymerization initiator (Y) used, and thus are not particularly limited and may be suitably set. For example, in the case where a photopolymerization initiator is used as the photopolymerization initiator (Y), the coating surface is preferably irradiated with active energy rays such as ultraviolet rays under normal temperature conditions (20±15° C.). In the case where a peroxide is used, the curing by heating is performed at 80° C. to 250° C. for about 1 to 60 minutes. A secondary curing process may be performed by conducting the curing by heating at 40° C. to 200° C. for about 1 to 10 hours.

The optical molded body produced from the radical-curable hot-melt urethane resin composition of the present invention has excellent properties such as flexibility, durability (particularly hydrolysis resistance), transparency (light permeability), heat stability, yellowing resistance (non-yellowing), adhesion to a base, and productivity (quick-curing property). Therefore, the radical-curable hot-melt urethane resin composition can be suitably used for various light-guiding articles such as a light-guiding film, a light-guiding sheet, a protective film, a key sheet film, an optical film, a light-guiding plate, and a light-guiding fiber.

When the optical molded body is assumed to be used in the form of, for example, a film or sheet, the thickness is preferably 5 to 1000 μm. When the thickness is within the above-described range, appropriate flexibility, high durability (particularly hydrolysis resistance), transparency (light permeability), heat stability, yellowing resistance (non-yellowing), adhesion to a base, and productivity (quick-curing property) can be achieved.

In the present invention, as generally designated in Japan, articles having a thickness of 200 μm or less are defined as "films" and articles having a thickness of more than 200 μm are defined as "sheets".

In the present invention, it has been found for the first time that a radical-curable hot-melt urethane resin composition having significantly improved properties such as appropriate flexibility, durability (particularly hydrolysis resistance), transparency (light permeability), heat stability, yellowing resistance (non-yellowing), adhesion to a base, and high productivity (quick-curing property) and an optical molded body that uses the radical-curable hot-melt urethane resin composition can be produced by combining the following features [1] to [4].

Feature [1]: When the polyol (A) contains the aliphatic polycarbonate polyol (a1), the alicyclic polycarbonate polyol (a2), or the aliphatic polyether polyol (a3) (particularly PTMG or a PTMG derivative), appropriate flexibility, high durability (particularly hydrolysis resistance), and transparency (light permeability) can be provided.

Feature [2]: When the polyol (A) contains the alicyclic polyester polyol (a4) as a "compatibilizer" together with the polyol (a1), (a2), or (a3), the compatibility between the polyol components can be further improved, good initial cohesion to a base can be maintained, appropriate flexibility and high durability (particularly hydrolysis resistance) can be further improved, and both hot-melt property and transparency can be achieved by providing a heat-melted state during the application and quick curing by cooling after the application.

Feature [3]: When the alicyclic polyisocyanate (B) is used as a polyisocyanate, high reactivity between an isocyanate group of the alicyclic polyisocyanate (B) and the polyol (A) or moisture (water), high heat resistance, yellowing resistance, transparency (light permeability), and the like can be provided.

Feature [4]: When the hot-melt urethane (X) obtained by introducing a (meth)acryloyl group using the (meth)acrylate compound (D) having an active-hydrogen-containing group in an amount of more than 50 mol % and 100 mol % or less of the total number of isocyanate groups of the hot-melt urethane prepolymer (C) having the isocyanate groups at its terminals and the radical polymerization initiator (Y) are contained, appropriate flexibility and an excellent quick-curing property can be provided.

As described above, the radical-curable hot-melt urethane resin composition of the present invention has two properties of a "hot-melt property" that achieves quick curing by cooling after application onto a base and a "quick-curing property" achieved by irradiation with active energy rays such as infrared rays, visible light, ultraviolet rays, X rays, electron beams, α rays, β rays, γ rays, or sunlight, and also has appropriate flexibility, high durability (particularly hydrolysis resistance), high transparency (light permeability) for efficiently guiding LED (light-emitting diode) light, heat stability such that degradation, deformation, discoloration, and the like do not occur even under exposure in a high temperature condition for a long time, yellowing resistance (non-yellowing), and high productivity (quick-curing property). Therefore, the radical-curable hot-melt urethane resin composition is useful for various optical molded bodies (light-guiding articles such as a light-guiding film, a light-guiding sheet, a protective film, a key sheet film, an optical film, a light-guiding plate, and a light-guiding fiber).

EXAMPLES

The present invention will now be specifically described based on Examples, but the scope of the present invention is not limited to Examples.

[Method for Measuring Melt Viscosity of Isocyanate-Terminated Hot-Melt Urethane Prepolymer (C) and Hot-Melt Urethane (X) Obtained by Introducing (meth)acryloyl Group]

The melt viscosity (mPa·s) of each of urethane prepolymers (C) and hot-melt urethanes (X) obtained in Examples and Comparative Examples was measured at a measurement temperature of 100° C. using a cone-plate viscometer (manufactured by ICI). Hereinafter, the unit and measurement temperature are omitted.

[Method for Measuring Softening Temperature of Prepolymer (C)]

The softening temperature (dry-bulb softening point) (° C.) of each of urethane prepolymers (C) obtained in Examples and Comparative Examples was measured at a temperature-increasing rate of 5° C./min in conformity with JIS K 2207.

[Method for Evaluating Heat Stability of Radical-Curable Hot-Melt Urethane Resin Composition]

Three hundred grams of each of radical-curable hot-melt urethane resin compositions (melt viscosity $V_0$, unit: mPa·s, measurement temperature 100° C.) obtained in Examples and Comparative Examples was weighed and inserted into a 300 ml metal can, and then the metal can was sealed after being purged with nitrogen. After the metal can was left to stand in a dryer having an internal temperature of 100° C. for 12 hours, the melt viscosity $V_{12}$ (unit: mPa·s, measurement temperature 100° C.) of the resin composition was measured.

Subsequently, the heat stability was evaluated based on the following criteria using the viscosity-increasing ratio of melt viscosity calculated from the formula below.

Viscosity-increasing ratio=(Melt viscosity $V_{12}$ after 12 hours at 100° C.)/(Initial melt viscosity $V_0$)

Evaluation criteria of heat stability

Good: When the viscosity-increasing ratio is 1.00 or more and less than 1.20, the heat stability is high.

Poor: When the viscosity-increasing ratio is 1.20 or more, the heat stability is low.

[Method for Evaluating Transparency]

Each of radical-curable hot-melt urethane resin compositions obtained in Examples and Comparative Examples was melted by performing heating at 100° C. and applied onto a PET that served as a base, had a thickness of 70 μm, and had been subjected to releasing treatment using a knife coater heated to 100° C. with a thickness of 100 μm. A conveyer-type ultraviolet irradiation apparatus CSOT-40 (manufactured by Japan Storage Battery Co., Ltd., use of high pressure mercury lamp, intensity: 120 W/cm, conveyer speed: 5 m/min) was set so that an ultraviolet dose of 145 mJ/cm² was applied to the coating surface each time the base was passed through the apparatus. Irradiation with ultraviolet rays was then performed by passing the base through the apparatus one time. Next, the base was left to stand for 3 days in a thermo-hygrostat at a temperature of 23° C. and a relative humidity of 65% and thus a moisture curable reaction was caused to proceed. The thus-formed film was released from the release paper to obtain a cured film. The ultraviolet dose was measured at wavelengths of 400 nm and 900 nm using a UV checker UVR-N1 (manufactured by Japan Storage Battery Co., Ltd.).

The total light transmittance (%) of the cured film formed above was measured in conformity with JIS K 7361-1 using a haze meter (manufactured by NIPPON DENSHOKU INDUSTRIES CO., LTD., model: NDH-2000). The transparency of the cured film was evaluated based on the measurement results of the total light transmittance (%) in accordance with the following criteria.

Evaluation criteria of transparency

Good: When the total light transmittance is 90% or more, the transparency is high.

Poor: When the total light transmittance is less than 90%, the transparency is low.

[Method for Evaluating Flexibility of Cured Film]

The cured film formed above was cut into test pieces having a width of 5 mm and a length of 70 mm. The tensile properties of each of the test pieces were measured in conformity with JIS K-7311 using Tensilon (manufactured by SHIMADZU CORPORATION, head speed=300 mm/min) to evaluate the flexibility.

The flexibility of the cured film was evaluated based on 100% modulus among tensile properties in accordance with the following criteria.

Evaluation criteria of flexibility

Good: When 5.0 MPa or less, the flexibility is good.

Fair: When more than 5.0 Mpa and 10.0 Mpa or less, the flexibility is normal.

Poor: When more than 10.0 Mpa, the flexibility is low.

[Method for Evaluating Hydrolysis Resistance]

The cured film formed above was subjected to a hydrolysis resistance test (accelerating test conditions: holding at a temperature of 70° C. and a relative humidity of 95% for 10 weeks). Subsequently, the tensile properties were measured under the same measurement conditions as the method for evaluating flexibility described above. The evaluation was performed in accordance with the following criteria.

Evaluation criteria of hydrolysis resistance

Good: When the strength retention is 90% or more, the hydrolysis resistance is high.

Poor: When the strength retention is less than 90%, the hydrolysis resistance is low.

[Method for Evaluating Yellowing Resistance]

The cured film formed above was subjected to an exposure test using a sunshine weather meter (manufactured by Suga Test Instruments Co., Ltd., measurement temperature: 83° C., no rain, light source: carbon arc) for 400 hours. The yellowness (yellow index: Y.I) before and after the exposure was measured using a multi-light source spectro color meter (manufactured by Suga Test Instruments Co., Ltd.) to determine the amount of change in the yellowness ($\Delta Y.I$).

The yellowing resistance of the cured film was evaluated based on the amount of change in the yellowness ($\Delta Y.I$) in accordance with the following criteria.

Evaluation criteria of yellowing resistance

Good: When the amount of change in yellowness ($\Delta Y.I$) is 2 or less, the yellowing resistance is high.

Poor: When the amount of change in yellowness ($\Delta Y.I$) is more than 2, the yellowing resistance is low.

[Method for Evaluating Quick-Curing Property]

The presence or absence of surface tackiness of the cured film just after the UV irradiation and heat curing was confirmed by finger touch. The quick-curing property was evaluated in accordance with the following criteria.

Evaluation criteria of quick-curing property

Good: When no surface tackiness is left at all, the quick-curing property is good.

Fair: When slight tackiness is left on the surface, the quick-curing property is normal.

Poor: When surface tackiness is obviously left, the quick-curing property is poor.

Synthesis Example 1

Synthesis of Isocyanate-Terminated Hot-Melt Urethane Prepolymer (C-1)

Eighty parts of an aliphatic polycarbonate polyol (a1) (trademark: DURANOL T-5652 manufactured by Asahi Kasei Chemicals Corp.) having a number-average molecular weight (Mn) of 2000 and obtained by causing a reaction of 1,5-pentanediol (abbreviated as 1,5PD), 1,6-hexanediol (abbreviated as 1,6HD), and a dialkyl carbonate was charged into a reaction vessel. The aliphatic polycarbonate polyol (a1) was heated to 100° C. at a reduced pressure and dehydrated until the moisture percentage reached 0.05% by mass.

Subsequently, the aliphatic polycarbonate polyol (a1) was cooled to 70° C. and 24.0 parts by mass of dicyclohexylmethane-4,4'-diisocyanate (abbreviated as HMDI) serving as the alicyclic polyisocyanate (B) was added thereto. The temperature was increased to 100° C. and a reaction was caused to proceed for 3 hours until the isocyanate content became constant to obtain an isocyanate-terminated hot-melt urethane prepolymer (C-1).

The melt viscosity of the urethane prepolymer (C-1) at 100° C. was 3600 mPa·s and the isocyanate content (NCO %) was 3.89% by mass. Table 1 collectively shows the properties of the urethane prepolymer (C-1) obtained in Synthesis Example 1.

Synthesis Examples 2 to 17

Synthesis of Urethane Prepolymers (C-2) to (C-17)

Urethane prepolymers (C-2) to (C-17) were synthesized through the same reaction as in Synthesis Example 1 in accordance with the mixing ratio listed in Tables 1 and 2. Tables 1 and 2 collectively show the properties of the urethane prepolymers.

Example 1

Production of Radical-Curable Hot-Melt Urethane Resin Composition (RHM1)

One hundred parts by mass of the isocyanate-terminated hot-melt urethane prepolymer (C-1) obtained in Synthesis Example 1 was melted by performing heating at 100° C., and 10.7 parts by mass of 2-hydroxyethyl acrylate (HEA) serving as the (meth)acrylate compound (D) having an active-hydrogen-containing group and 0.01 parts by mass of stannous octylate were added thereto. A reaction was caused to proceed at an internal temperature of 100° C. until the NCO % became constant to obtain a hot-melt urethane (X) into which a (meth)acryloyl group was introduced.

The (meth)acrylate compound (D) having an active-hydrogen-containing group was added so that the ratio [[OH/NCO]×100(%)] of the number of NCO groups with which the HEA serving as the (meth)acrylate compound (D) reacted relative to the total number of isocyanate groups of the urethane prepolymer (C-1) was 55% in terms of theoretical value.

Table 1 collectively shows the composition and properties of the hot-melt urethane (X-1). The melt viscosity of the hot-melt urethane (X-1) at 100° C. was 3690 mPa·s and the isocyanate content (NCO %) was 1.75% by mass.

Subsequently, 100 parts by mass of the hot-melt urethane (X-1) and 2.0 parts by mass of IRGACURE 184 (manufactured by Ciba Specialty Chemicals) serving as the radical polymerization initiator (Y-1) were mixed with each other under stirring to obtain a radical-curable hot-melt urethane resin composition (RHM1) of the present invention.

The ratio [[OH/NCO]×100(%)] of the number of NCO groups with which the (meth)acrylate compound (D) having an active-hydrogen-containing group reacted relative to the total number of isocyanate groups of the urethane prepolymer (C-1) can be determined by a conventional method in which an excessive amount of dibutylamine is added to cause a reaction between an isocyanate group and the dibutylamine and then the amount of dibutylamine left is measured by back titration using hydrochloric acid to calculate the amount of isocyanate group.

Regarding the urethane prepolymers (C-2) to (C-17) listed in Tables 1 and 2, the ratio [[OH/NCO]×100(%)] of the number of NCO groups with which the (meth)acrylate compound (D) reacted was also determined by the same method as in the urethane prepolymer (C-1).

<<Optical Molded Body 1 Produced from Radical-Curable Hot-Melt Urethane Resin Composition>>

The radical-curable hot-melt urethane resin composition (RHM1) obtained above was melted by performing heating at 100° C. and applied onto a PET that served as a base, had a thickness of 70 μm, and had been subjected to releasing treatment using a knife coater heated to 100° C. with a thickness of 100 μm. A conveyer-type ultraviolet irradiation apparatus CSOT-40 (manufactured by Japan Storage Battery Co., Ltd., use of high pressure mercury lamp, intensity: 120 W/cm, conveyer speed: 5 m/min) was set so that an ultraviolet dose of 145 mJ/cm$^2$ was applied to the coating surface each time the base was passed through the apparatus. Irradiation with ultraviolet rays (UV irradiation) was then performed by passing the base through the apparatus one time. Next, the base was left to stand for 3 days in a thermo-hygrostat at a temperature of 23° C. and a relative humidity of 65% to obtain an optical molded product 1 after moisture curing.

Table 1 shows the evaluation results of the properties of the optical molded product 1 produced from the radical-curable hot-melt urethane resin composition (RHM1) of the present invention. The surface tackiness disappeared after the UV irradiation and the optical molded product 1 had excellent properties such as appropriate flexibility, mechanical strength, durability (hydrolysis resistance), and yellowing resistance.

Example 2 and Example 3

In Examples 2 and 3, radical-curable hot-melt urethane resin compositions (RHM2 and RHM3) of the present invention were produced in the same manner as in Example 1, except that the amounts of HEA serving as the (meth)acrylate compound (D) having an active-hydrogen-containing group were respectively changed to 5.9 parts by mass (Example 2) and 8.1 parts by mass (Example 3).

The ratio [[OH/NCO]×100(%)] of the number of NCO groups with which the HEA serving as the (meth)acrylate compound (D) reacted relative to the total number of isocyanate groups of the urethane prepolymer (C-1) was set to be 75% (Example 2) and 100% (Example 3) in terms of theoretical value.

Subsequently, cured optical molded products 2 and 3 were produced from the radical-curable hot-melt urethane resin compositions (RHM2 and RHM3), respectively, in the same manner as in Example 1.

Table 1 shows the evaluation results of the optical molded products 2 and 3. The surface tackiness disappeared after the UV irradiation and the optical molded products 2 and 3 had excellent properties such as appropriate flexibility, mechanical strength, durability (hydrolysis resistance), and yellowing resistance.

Example 4 to Example 28, Example 33 and Example 34, and Comparative Example 1 to Comparative Example 16

Examples and Comparative Examples above were conducted through the same reaction as in Example 1 in accordance with the mixing ratio listed in Tables 1 and 2. Tables 1 and 2 show the evaluation results of the obtained urethane prepolymers (C-2) to (C-17), hot-melt urethanes (X-4) to (X-48), and radical-curable hot-melt urethane resin compositions (RHM4) to (RHM48).

Example 29 to Example 32

Examples above were conducted through the same reaction as in Example 1 in accordance with the mixing ratio listed in Table 1. Table 1 shows the evaluation results of the obtained urethane prepolymers (C-6) and (C-7), hot-melt urethanes (X-29) to (X-32), and radical-curable hot-melt urethane resin compositions (RHM29) to (RHM32) obtained by adding PEROYL TCP serving as the photopolymerization initiator (Y-2) to the hot-melt urethane (X-29) to (X-32), respectively.

Subsequently, the radical-curable hot-melt urethane resin compositions (RHM29 to RHM32) obtained above were melted by performing heating at 100° C. and applied onto a PET that served as a base, had a thickness of 70 μm, and had been subjected to releasing treatment using a knife coater heated to 100° C. with a thickness of 100 μm. The coating surface was then left to stand for 10 minutes in a dryer heated to 150° C. to perform curing by heating. Next, the base was left to stand for 3 days in a thermo-hygrostat at a temperature of 23° C. and a relative humidity of 65% to obtain optical molded products 29 to 32 after moisture curing.

Table 1 shows the evaluation results of the properties of the optical molded products 29 to 32 respectively produced from the radical-curable hot-melt urethane resin compositions (RHM29 to RHM32) of the present invention. The surface tackiness disappeared after the curing by heating and the optical molded products 29 to 32 had excellent properties such as appropriate flexibility, mechanical strength, durability (hydrolysis resistance), and yellowing resistance.

TABLE 1

|  | Example 1 | Example 2 | Example 3 | Example 4 | Example 5 | Example 6 |
|---|---|---|---|---|---|---|
| Short for NCO-terminated urethane prepolymer (C) | (C-1) | (C-1) | (C-1) | (C-2) | (C-2) | (C-2) |
| Polyol (A) (part by mass) |  |  |  |  |  |  |
| Aliphatic polycarbonate polyol (a1) |  |  |  |  |  |  |
| DURANOL T5652 (1,5PG/HG:PC-2000) (a1-1) | 80 | 80 | 80 | — | — | — |
| Aliphatic polyether polyol (a3) |  |  |  |  |  |  |
| PTMG-1000 (a3-1) | — | — | — | 80 | 80 | 80 |
| Alicyclic polyisocyanate (B) (part by mass) |  |  |  |  |  |  |
| HMDI (B-1) | 23 | 23 | 23 | 35 | 35 | 35 |
| Total | 103 | 103 | 103 | 115 | 115 | 115 |
| Properties of NCO-terminated urethane prepolymer (C) |  |  |  |  |  |  |
| NCO % | 3.89 | 3.89 | 3.89 | 3.90 | 3.90 | 3.90 |
| Melt viscosity (mPa·s/100° C.) | 3600 | 3600 | 3600 | 1800 | 1800 | 1800 |
| Softening temperature (° C.) | 28 | 28 | 28 | 23 | 23 | 23 |
| Radical-curable hot-melt urethane resin composition (RHM) | 1 | 2 | 3 | 4 | 5 | 6 |
| Short for hot-melt urethane (X) having (meth)acryloyl group | (X-1) | (X-2) | (X-3) | (X-4) | (X-5) | (X-6) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |
| Ratio of number of NCO groups with which OH group of (D) reacted |  |  |  |  |  |  |
| [OH of (D)/NCO] × 100 (%) | 55 | 75 | 100 | 55 | 75 | 100 |
| Properties of hot-melt urethane (X) having (meth)acryloyl group |  |  |  |  |  |  |
| Melt viscosity V0 (mPa·s/100° C.) | 3690 | 3680 | 3650 | 1840 | 1820 | 1800 |
| NCO % | 1.75 | 0.93 | 0.00 | 1.75 | 0.93 | 0.00 |
| Radical polymerization initiator (Y) (part by mass) |  |  |  |  |  |  |
| IRGACURE 184(Y-1) | 2 | 2 | 2 | 4 | 4 | 4 |
| Evaluation results |  |  |  |  |  |  |
| No. of cured film | 1 | 2 | 3 | 4 | 5 | 6 |
| Heat stability: | Good | Good | Good | Good | Good | Good |
| Melt viscosity V12 after 100° C. × 12 hours (mPa·s/100° C.) | 3720 | 3700 | 3660 | 1860 | 1830 | 1810 |
| Transparency: total light transmittance (wavelength 900 nm) | Good | Good | Good | Good | Good | Good |
| (%) (wavelength 400 nm) | Good | Good | Good | Good | Good | Good |
| Film properties: flexibility | Good | Good | Good | Good | Good | Good |
| Mechanical properties in normal state |  |  |  |  |  |  |
| 100% modulus (MPa) | 2.2 | 2.8 | 3.8 | 1.3 | 2.5 | 3.5 |
| Breaking stress (MPa) | 38.0 | 35.0 | 32.0 | 33.0 | 32.0 | 30.0 |
| Breaking elongation (%) | 380 | 280 | 240 | 350 | 280 | 250 |
| Durability: mechanical properties after hydrolysis resistance test | Good | Good | Good | Good | Good | Good |
| 100% modulus (MPa) | 2.2 | 2.8 | 3.8 | 1.2 | 2.5 | 3.5 |
| Breaking stress (MPa) | 38.0 | 35.0 | 32.0 | 33.0 | 32.0 | 30.0 |
| Breaking elongation (%) | 390 | 280 | 240 | 360 | 280 | 250 |
| Yellowing property | Good | Good | Good | Good | Good | Good |
| Quick-curing property | Good | Good | Good | Good | Good | Good |

TABLE 1-continued

|  | Example 7 | Example 8 | Example 9 | Example 10 | Example 11 | Example 12 |
|---|---|---|---|---|---|---|
| Short for NCO-terminated urethane prepolymer (C) | (C-3) | (C-3) | (C-4) | (C-4) | (C-5) | (C-5) |
| Polyol (A) (part by mass) | | | | | | |
| Aliphatic polycarbonate polyol (a1) | | | | | | |
| DURANOL T5652 (1,5PG/HG:PC-2000) (a1-1) | — | — | — | — | 60 | 60 |
| Alicyclic polycarbonate polyol (a2) | | | | | | |
| UC100 (CHDM:PC-1000) (a2-1) | 80 | 80 | — | — | — | — |
| Aliphatic polyether polyol (a3) | | | | | | |
| PTXG-1000 (a3-2) | — | — | 80 | 80 | — | — |
| Alicyclic polyester polyol (a4) | | | | | | |
| CHDM/SUCA-1000 (a4-1) | — | — | — | — | 20 | 20 |
| Alicyclic polyisocyanate (B) (part by mass) | | | | | | |
| HMDI (B-1) | 35 | 35 | 35 | 35 | 26 | 26 |
| Total | 115 | 115 | 115 | 115 | 106 | 106 |
| Properties of NCO-terminated urethane prepolymer (C) | | | | | | |
| NCO % | 3.91 | 3.91 | 3.91 | 3.91 | 3.89 | 3.89 |
| Melt viscosity (mPa·s/100° C.) | 4200 | 4200 | 1600 | 1600 | 2600 | 2600 |
| Softening temperature (° C.) | 70 | 70 | 18 | 18 | 35 | 35 |
| Radical-curable hot-melt urethane resin composition (RHM) | 7 | 8 | 9 | 10 | 11 | 12 |
| Hot-melt urethane (X) having (meth)acryloyl group | (X-7) | (X-8) | (X-9) | (X-10) | (X-11) | (X-12) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |
| Ratio of number of NCO groups with which OH group of (D) reacted | | | | | | |
| [OH of (D)/NCO] × 100 (%) | 55 | 100 | 55 | 100 | 55 | 100 |
| Properties of hot-melt urethane (X) having (meth)acryloyl group | | | | | | |
| Melt viscosity (mPa·s/100° C.) | 4250 | 4210 | 1610 | 1600 | 2620 | 2610 |
| NCO % | 1.76 | 0.00 | 1.75 | 0.00 | 1.76 | 0 |
| Radical polymerization initiator (Y) (part by mass) | | | | | | |
| IRGACURE 184 (Y-1) | 0.6 | 0.6 | 2 | 2 | 2 | 2 |
| PEROYL TCP (Y-2) | — | — | — | — | — | — |
| Evaluation results | | | | | | |
| No. of cured film | 7 | 8 | 9 | 10 | 11 | 12 |
| Heat stability: | Good | Good | Good | Good | Good | Good |
| Melt viscosity V12 after 100° C. × 12 hours (mPa·s/100° C.) | 4270 | 4220 | 1630 | 1610 | 2650 | 2610 |
| Transparency: total light transmittance (%) (wavelength 900 nm) | Good | Good | Good | Good | Good | Good |
| (wavelength 400 nm) | Good | Good | Good | Good | Good | Good |
| Film properties: flexibility | Good | Good | Good | Good | Good | Good |
| Mechanical properties in normal state | | | | | | |
| 100% modulus (MPa) | 4.2 | 5.0 | 1.8 | 3.2 | 2.4 | 4.0 |
| Breaking stress (MPa) | 23.0 | 21.0 | 32.0 | 28.0 | 35.0 | 30.0 |
| Breaking elongation (%) | 340 | 210 | 340 | 210 | 350 | 240 |
| Durability: mechanical properties after hydrolysis resistance test | Good | Good | Good | Good | Good | Good |
| 100% modulus (MPa) | 4.5 | 5.5 | 1.8 | 3.2 | 2.4 | 4.0 |
| Breaking stress (MPa) | 22.0 | 21.0 | 32.0 | 28.0 | 21.0 | 20.0 |
| Breaking elongation (%) | 360 | 210 | 360 | 210 | 360 | 230 |
| Yellowing property | Good | Good | Good | Good | Good | Good |
| Quick-curing property | Good | Good | Good | Good | Good | Good |

|  | Example 13 | Example 14 | Example 15 | Example 16 | Example 17 | Example 18 |
|---|---|---|---|---|---|---|
| Short for NCO-terminated urethane prepolymer (C) | (C-6) | (C-6) | (C-7) | (C-7) | (C-8) | (C-8) |
| Polyol (A) (part by mass) | | | | | | |
| Aliphatic polycarbonate polyol (a1) | | | | | | |
| DURANOL T5652 (1,5PG/HG:PC-2000) (a1-1) | 40 | 40 | — | — | — | — |
| Alicyclic polycarbonate polyol (a2) | | | | | | |
| UC100 (CHDM:PC-1000) (a2-1) | — | — | 20 | 20 | 50 | 50 |

TABLE 1-continued

| | | | | | | |
|---|---|---|---|---|---|---|
| Aliphatic polyether polyol (a3) | | | | | | |
| PTMG-1000 (a3-1) | — | — | 60 | 60 | 30 | 30 |
| Alicyclic polyester polyol (a4) | | | | | | |
| CHDM/SUCA-1000 (a4-1) | 40 | 40 | — | — | — | — |
| Alicyclic polyisocyanate (B) (part by mass) | | | | | | |
| HMDI (B-1) | 29 | 29 | 35 | 35 | 35 | 35 |
| Total | 109 | 109 | 115 | 115 | 115 | 115 |
| Properties of NCO-terminated urethane prepolymer (C) | | | | | | |
| NCO % | 3.90 | 3.90 | 3.91 | 3.91 | 3.91 | 3.91 |
| Melt viscosity (mPa·s/100° C.) | 4100 | 4100 | 2200 | 2200 | 3500 | 3500 |
| Softening temperature (° C.) | 42 | 42 | 35 | 35 | 58 | 58 |
| Radical-curable hot-melt urethane resin composition (RHM) | 13 | 14 | 15 | 16 | 17 | 18 |
| Hot-melt urethane (X) having (meth)acryloyl group | (X-13) | (X-14) | (X-15) | (X-16) | (X-17) | (X-18) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |
| Ratio of number of NCO groups with which OH group of (D) reacted | | | | | | |
| [OH of (D)/NCO] × 100 (%) | 55 | 100 | 55 | 100 | 55 | 100 |
| Properties of hot-melt urethane (X) having (meth)acryloyl group | | | | | | |
| Melt viscosity (mPa·s/100° C.) | 4180 | 4150 | 2220 | 2200 | 3550 | 3520 |
| NCO % | 1.76 | 0.00 | 1.76 | 0 | 1.75 | 0 |
| Radical polymerization initiator (Y) (part by mass) | | | | | | |
| IRGACURE 184 (Y-1) | 2 | 2 | 2 | 2 | 2 | 2 |
| Evaluation results | | | | | | |
| No. of cured film | 13 | 14 | 15 | 16 | 17 | 18 |
| Heat stability: | Good | Good | Good | Good | Good | Good |
| Melt viscosity V12 after 100° C. × 12 hours (mPa·s/100° C.) | 4180 | 4150 | 2230 | 2210 | 3600 | 3530 |
| Transparency: total light transmittance (%) (wavelength 900 nm) | Good | Good | Good | Good | Good | Good |
| (wavelength 400 nm) | Good | Good | Good | Good | Good | Good |
| Film properties: flexibility | Good | Good | Good | Good | Good | Good |
| Mechanical properties in normal state | | | | | | |
| 100% modulus (MPa) | 2.5 | 4.2 | 1.5 | 3.0 | 1.7 | 3.5 |
| Breaking stress (MPa) | 33.0 | 30.0 | 35.0 | 33.0 | 34.0 | 32.0 |
| Breaking elongation (%) | 230 | 220 | 400 | 320 | 340 | 210 |
| Durability: mechanical properties after hydrolysis resistance test | Good | Good | Good | Good | Good | Good |
| 100% modulus (MPa) | 2.5 | 4.2 | 1.5 | 3.0 | 1.7 | 3.5 |
| Breaking stress (MPa) | 32.0 | 29.0 | 35.0 | 33.0 | 34.0 | 32.0 |
| Breaking elongation (%) | 230 | 210 | 420 | 310 | 340 | 210 |
| Yellowing property | Good | Good | Good | Good | Good | Good |
| Quick-curing property | Good | Good | Good | Good | Good | Good |

| | Example 19 | Example 20 | Example 21 | Example 22 | Example 23 | Example 24 |
|---|---|---|---|---|---|---|
| Short for NCO-terminated urethane prepolymer (C) | (C-9) | (C-9) | (C-10) | (C-10) | (C-11) | (C-11) |
| Polyol (A) (part by mass) | | | | | | |
| Aliphatic polycarbonate polyol (a1) | | | | | | |
| DURANOL T5652 (1,5PG/HG:PC-2000) (a1-1) | 50 | 50 | 20 | 20 | 60 | 60 |
| Aliphatic polyether polyol (a3) | | | | | | |
| PTMG-1000 (a3-1) | 20 | 20 | 20 | 20 | — | — |
| Alicyclic polyester polyol (a4) | | | | | | |
| CHDM/SUCA-1000 (a4-1) | 10 | 10 | 40 | 40 | 20 | 20 |
| Alicyclic polyisocyanate (B) (part by mass) | | | | | | |
| HMDI (B-1) | 28 | 28 | 33 | 33 | — | — |
| BICH (B-2) | — | — | — | — | 19 | 19 |
| Total | 108 | 108 | 113 | 113 | 99 | 99 |

TABLE 1-continued

| Properties of NCO-terminated urethane prepolymer (C) | | | | | | |
|---|---|---|---|---|---|---|
| NCO % | 3.90 | 3.90 | 3.94 | 3.94 | 4.07 | 4.07 |
| Melt viscosity (mPa · s/100° C.) | 2300 | 2300 | 1900 | 1900 | 2500 | 2500 |
| Softening temperature (° C.) | 36 | 36 | 52 | 52 | 34 | 34 |
| Radical-curable hot-melt urethane resin composition (RHM) | 19 | 20 | 21 | 22 | 23 | 24 |
| Hot-melt urethane (X) having (meth)acryloyl group | (X-19) | (X-20) | (X-21) | (X-22) | (X-23) | (X-24) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |
| Ratio of number of NCO groups with which OH group of (D) reacted | | | | | | |
| [OH of (D)/NCO] × 100 (%) | 55 | 100 | 55 | 100 | 55 | 100 |
| Properties of hot-melt urethane (X) having (meth)acryloyl group | | | | | | |
| Melt viscosity (mPa · s/100° C.) | 2330 | 2310 | 1920 | 1900 | 2540 | 2520 |
| NCO % | 1.75 | 0 | 1.76 | 0 | 1.83 | 0 |
| Radical polymerization initiator (Y) (part by mass) | | | | | | |
| IRGACURE 184 (Y-1) | 2 | 2 | 2 | 2 | 2 | 2 |
| Evaluation results | | | | | | |
| No. of cured film | 19 | 20 | 21 | 22 | 23 | 24 |
| Heat stability: | Good | Good | Good | Good | Good | Good |
| Melt viscosity V12 after 100° C. × 12 hours (mPa · s/100° C.) | 2350 | 2320 | 1930 | 1910 | 2560 | 2530 |
| Transparency: total light transmittance (%) (wavelength 900 nm) | Good | Good | Good | Good | Good | Good |
| (wavelength 400 nm) | Good | Good | Good | Good | Good | Good |
| Film properties: flexibility | Good | Good | Good | Good | Good | Good |
| Mechanical properties in normal state | | | | | | |
| 100% modulus (MPa) | 2.5 | 4.2 | 2.7 | 4.5 | 2.3 | 4.0 |
| Breaking stress (MPa) | 34.0 | 31.0 | 32.0 | 30.0 | 34.0 | 31.0 |
| Breaking elongation (%) | 320 | 280 | 400 | 320 | 340 | 250 |
| Durability: mechanical properties after hydrolysis resistance test | Good | Good | Good | Good | Good | Good |
| 100% modulus (MPa) | 2.5 | 4.2 | 0.7 | 1.2 | 2.3 | 3.9 |
| Breaking stress (MPa) | 34.0 | 31.0 | 32.0 | 30.0 | 32.0 | 31.0 |
| Breaking elongation (%) | 320 | 280 | 450 | 320 | 330 | 250 |
| Yellowing property | Good | Good | Good | Good | Good | Good |
| Quick-curing property | Good | Good | Good | Good | Good | Good |

| | Example 25 | Example 26 | Example 27 | Example 28 | Example 29 | Example 30 |
|---|---|---|---|---|---|---|
| Short for NCO-terminated urethane prepolymer (C) | (C-12) | (C-12) | (C-13) | (C-14) | (C-6) | (C-6) |
| Polyol (A) (part by mass) | | | | | | |
| Aliphatic polycarbonate polyol (a1) | | | | | | |
| DURANOL T5652 (1,5PG/HG:PC-2000) (a1-1) | 60 | 60 | 50 | 50 | 40 | 40 |
| Aliphatic polyether polyol (a3) | | | | | | |
| PTMG-1000 (a3-1) | — | — | 20 | 20 | — | — |
| Alicyclic polyester polyol (a4) | | | | | | |
| CHDM/SUCA-1000 (a4-1) | 20 | 20 | 10 | 10 | 40 | 40 |
| Alicyclic polyisocyanate (B) (part by mass) | | | | | | |
| HMDI (B-1) | — | — | — | — | 29 | 29 |
| BICH (B-2) | — | — | 28 | — | — | — |
| IPDI (B-3) | 22 | 22 | — | 28 | — | — |
| Total | 102 | 102 | 108 | 108 | 109 | 109 |
| Properties of NCO-terminated urethane prepolymer (C) | | | | | | |
| NCO % | 3.93 | 3.93 | 4.00 | 7.99 | 3.90 | 3.90 |
| Melt viscosity (mPa · s/100° C.) | 2400 | 2400 | 2200 | 2250 | 4100 | 4100 |
| Softening temperature (° C.) | 33 | 33 | 35 | 34 | 42 | 42 |
| Radical-curable hot-melt urethane resin composition (RHM) | 25 | 26 | 27 | 28 | 29 | 30 |
| Hot-melt urethane (X) having (meth)acryloyl group | (X-25) | (X-26) | (X-27) | (X-28) | (X-29) | (X-30) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |

TABLE 1-continued

| Ratio of number of NCO groups with which OH group of (D) reacted | | | | | | |
|---|---|---|---|---|---|---|
| [OH of (D)/NCO] × 100 (%) | 55 | 100 | 100 | 100 | 55 | 100 |
| Properties of hot-melt urethane (X) having (meth)acryloyl group | | | | | | |
| Melt viscosity (mPa·s/100° C.) | 2430 | 2410 | 2220 | 2260 | 4130 | 4110 |
| NCO % | 1.75 | 0 | 0 | 0 | 1.76 | 0.00 |
| Radical polymerization initiator (Y) (part by mass) | | | | | | |
| IRGACURE 184 (Y-1) | 2 | 2 | 2 | 2 | — | — |
| PEROYL TCP (Y-2) | — | — | — | — | 2 | 2 |
| Evaluation results | | | | | | |
| No. of cured film | 25 | 26 | 27 | 28 | 29 | 30 |
| Heat stability: | Good | Good | Good | Good | Good | Good |
| Melt viscosity V12 after 100° C. × 12 hours (mPa·s/100° C.) | 2450 | 2420 | 2230 | 2270 | 4140 | 4145 |
| Transparency: total light transmittance (%) (wavelength 900 nm) | Good | Good | Good | Good | Good | Good |
| (wavelength 400 nm) | Good | Good | Good | Good | Good | Good |
| Film properties: flexibility | Good | Good | Good | Good | Good | Good |
| Mechanical properties in normal state | | | | | | |
| 100% modulus (MPa) | 2.4 | 4.2 | 4.5 | 4.2 | 2.5 | 4.2 |
| Breaking stress (MPa) | 34.5 | 30.0 | 34.0 | 31.0 | 32.0 | 29.0 |
| Breaking elongation (%) | 360 | 260 | 320 | 280 | 230 | 220 |
| Durability: mechanical properties after hydrolysis resistance test | Good | Good | Good | Good | Good | Good |
| 100% modulus (MPa) | 2.4 | 4.2 | 4.5 | 4.2 | 2.5 | 4.2 |
| Breaking stress (MPa) | 34.5 | 30.0 | 34.0 | 31.0 | 32.0 | 29.0 |
| Breaking elongation (%) | 360 | 260 | 320 | 280 | 230 | 210 |
| Yellowing property | Good | Good | Good | Good | Good | Good |
| Quick-curing property | Good | Good | Good | Good | Good | Good |

| | Example 31 | Example 32 | Example 33 | Example 34 |
|---|---|---|---|---|
| Short for NCO-terminated urethane prepolymer (C) | (C-7) | (C-7) | (C-5) | (C-5) |
| Polyol (A) (part by mass) | | | | |
| Aliphatic polycarbonate polyol (a1) | | | | |
| DURANOL T5652 (1,5PG/HG:PC-2000) (a1-1) | — | — | 60 | 60 |
| Alicyclic polycarbonate polyol (a2) | | | | |
| UC100 (CHDM:PC-1000) (a2-1) | 20 | 20 | — | — |
| Aliphatic polyether polyol (a3) | | | | |
| PTMG-1000 (a3-1) | 60 | 60 | — | — |
| Alicyclic polyester polyol (a4) | | | | |
| CHDM/SUCA-1000 (a4-1) | — | — | 20 | 20 |
| Alicyclic polyisocyanate (B) (part by mass) | | | | |
| HMDI (B-1) | 35 | 35 | 26 | 26 |
| Total | 115 | 115 | 106 | 106 |
| Properties of NCO-terminated urethane prepolymer (C) | | | | |
| NCO % | 3.91 | 3.91 | 3.89 | 3.89 |
| Melt viscosity (mPa·s/100° C.) | 2200 | 2200 | 2600 | 2600 |
| Softening temperature (° C.) | 35 | 35 | 35 | 35 |
| Radical-curable hot-melt urethane resin composition (RHM) | 31 | 32 | 33 | 34 |
| Hot-melt urethane (X) having (meth)acryloyl group | (X-31) | (X-32) | (X-33) | (X-34) |
| Hot-melt urethane (X) (part by mass) | 100 | 100 | 100 | 100 |
| Type of (meth)acrylate compound (D) having active-hydrogen-containing group | HEA | HEA | 4HBA | HEMA |
| Ratio of number of NCO groups with which OH group of (D) reacted | | | | |
| [OH of (D)/NCO] × 100 (%) | 55 | 100 | 100 | 100 |
| Properties of hot-melt urethane (X) having (meth)acryloyl group | | | | |
| Melt viscosity (mPa·s/100° C.) | 2300 | 2210 | 2670 | 2750 |
| NCO % | 1.75 | 0 | 0 | 0 |
| Radical polymerization initiator (Y) (part by mass) | | | | |
| IRGACURE 184 (Y-1) | — | — | 2 | 2 |
| PEROYL TCP (Y-2) | 2 | 2 | — | — |

TABLE 1-continued

| | | | | |
|---|---|---|---|---|
| Evaluation results | | | | |
| No. of cured film | 31 | 32 | 33 | 34 |
| Heat stability: | Good | Good | Good | Good |
| Melt viscosity V12 after 100° C. × 12 hours (mPa·s/100° C.) | 2350 | 2230 | 2680 | 2600 |
| Transparency: total light transmittance (%) (wavelength 900 nm) | Good | Good | Good | Good |
| (wavelength 400 nm) | Good | Good | Good | Good |
| Film properties: flexibility | Good | Good | Good | Good |
| Mechanical properties in normal state | | | | |
| 100% modulus (MPa) | 1.5 | 3.0 | 4.2 | 4.3 |
| Breaking stress (MPa) | 35.0 | 33.0 | 32.0 | 31.0 |
| Breaking elongation (%) | 400 | 320 | 220 | 260 |
| Durability: mechanical properties after hydrolysis resistance test | Good | Good | Good | Good |
| 100% modulus (MPa) | 1.5 | 3.0 | 4.0 | 4.0 |
| Breaking stress (MPa) | 35.0 | 33.0 | 32.0 | 31.0 |
| Breaking elongation (%) | 420 | 310 | 210 | 250 |
| Yellowing property | Good | Good | Good | Good |
| Quick-curing property | Good | Good | Good | Good |

TABLE 2

| | Comparative Example 1 | Comparative Example 2 | Comparative Example 3 | Comparative Example 4 | Comparative Example 5 | Comparative Example 6 |
|---|---|---|---|---|---|---|
| Short for NCO-terminated urethane prepolymer (C) | (C-1) | (C-1) | (C-2) | (C-2) | (C-5) | (C-6) |
| Polyol (A) (part by mass) | | | | | | |
| Aliphatic polycarbonate polyol (a1) | | | | | | |
| DURANOL T5652 (1,5PG/HG:PC-2000) (a1-1) | 80 | 80 | — | — | 60 | 40 |
| Aliphatic polyether polyol (a3) | | | | | | |
| PTMG-1000 (a3-1) | — | — | 80 | 80 | — | — |
| Alicyclic polyester polyol (a4) | | | | | | |
| CHDM/SUCA-1000 (a4-1) | — | — | — | — | 20 | 40 |
| Alicyclic polyisocyanate (B) (part by mass) | | | | | | |
| HMDI (B-1) | 23 | 23 | 35 | 35 | 26 | 29 |
| Total | 103 | 103 | 115 | 115 | 106 | 109 |
| Properties of NCO-terminated urethane prepolymer (C) | | | | | | |
| NCO % | 3.89 | 3.89 | 3.90 | 3.90 | 3.89 | 3.90 |
| Melt viscosity (mPa·s/100° C.) | 3600 | 3600 | 1800 | 1800 | 2600 | 4100 |
| Softening temperature (° C.) | 28 | 28 | 23 | 23 | 35 | 42 |
| Radical-curable hot-melt urethane resin composition (RHM) | 35 | 36 | 37 | 38 | 39 | 40 |
| Hot-melt urethane (X) having (meth)acryloyl group | (X-35) | (X-36) | (X-37) | (X-38) | (X-39) | (X-40) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |
| Ratio of number of NCO groups with which OH group of (D) reacted | | | | | | |
| [OH of (D)/NCO] × 100 (%) | 0 | 40 | 0 | 40 | 40 | 40 |
| Properties of hot-melt urethane (X) having (meth)acryloyl group | | | | | | |
| Melt viscosity (mPa·s/100° C.) | 3800 | 3700 | 1900 | 1870 | 2650 | 4160 |
| NCO % | 3.86 | 1.50 | 3.88 | 1.50 | 1.51 | 1.52 |
| Radical polymerization initiator (Y) (part by mass) | | | | | | |
| IRGACURE 184 (Y-1) | 2 | 2 | 2 | 2 | 2 | 2 |
| PEROYL TCP (Y-2) | — | — | — | — | — | — |
| Evaluation results | | | | | | |
| No. of cured film | 35 | 36 | 37 | 38 | 39 | 40 |
| Heat stability: | Good | Good | Good | Good | Good | Good |
| Melt viscosity V12 after 100° C. × 12 hours (mPa·s/100° C.) | 3900 | 3800 | 1980 | 1900 | 2700 | 4300 |
| Transparency: total light transmittance (%) (wavelength 900 nm) | *1 | Good | *1 | Good | Good | Good |
| (wavelength 400 nm) | *1 | Good | *1 | Good | Good | Good |
| Film properties: flexibility | *1 | Good | *1 | Good | Good | Good |
| Mechanical properties in normal state | | | | | | |
| 100% modulus (MPa) | *1 | 3.0 | *1 | 2.0 | 2.2 | 2.5 |
| Breaking stress (MPa) | *1 | 10.0 | *1 | 9.0 | 10.0 | 20.0 |

TABLE 2-continued

|  |  |  |  |  |  |  |
|---|---|---|---|---|---|---|
| Breaking elongation (%) | *1 | 160 | *1 | 130 | 160 | 200 |
| Durability: mechanical properties after hydrolysis resistance test | *1 | Poor | *1 | Poor | Poor | Poor |
| 100% modulus (MPa) | *1 | 0.5 | *1 | 0.3 | 0.8 | 1.8 |
| Breaking stress (MPa) | *1 | 5.0 | *1 | 2.0 | 7.0 | 12.0 |
| Breaking elongation (%) | *1 | 50 | *1 | 20 | 80 | 160 |
| Yellowing property | *1 | Good | *1 | Good | Good | Good |
| Quick-curing property | Poor | Fair | Poor | Fair | Fair | Fair |

|  | Comparative Example 7 | Comparative Example 8 | Comparative Example 9 | Comparative Example 10 | Comparative Example 11 | Comparative Example 12 |
|---|---|---|---|---|---|---|
| Short for NCO-terminated urethane prepolymer (C) | (C-7) | (C-8) | (C-1) | (C-1) | (C-15) | (C-15) |
| Polyol (A) (part by mass) |  |  |  |  |  |  |
| Aliphatic polycarbonate polyol (a1) |  |  |  |  |  |  |
| DURANOL T5652 (1,5PG/HG:PC-2000) (a1-1) | — | — | 80 | 80 | 80 | 80 |
| Alicyclic polycarbonate polyol (a2) |  |  |  |  |  |  |
| UC100 (CHDM:PC-1000) (a2-1) | 20 | 50 | — | — | — | — |
| Aliphatic polyether polyol (a3) |  |  |  |  |  |  |
| PTMG-1000 (a3-1) | 60 | 30 | — | — | — | — |
| Alicyclic polyisocyanate (B) (part by mass) |  |  |  |  |  |  |
| HMDI (B-1) | 35 | 35 | 23 | 23 | — | — |
| Aromatic polyisocyanate (part by mass) |  |  |  |  |  |  |
| MDI | — | — | — | — | 19 | — |
| XDI | — | — | — | — | — | 19 |
| Total | 115 | 115 | 103 | 103 | 99 | 99 |
| Properties of NCO-terminated urethane prepolymer (C) |  |  |  |  |  |  |
| NCO % | 3.91 | 3.91 | 3.89 | 3.89 | 3.85 | 3.85 |
| Melt viscosity (mPa·s/100° C.) | 2200 | 3600 | 3600 | 3600 | 3800 | 3800 |
| Softening temperature (° C.) | 35 | 58 | 28 | 28 | 30 | 30 |
| Radical-curable hot-melt urethane resin composition (RHM) | 41 | 42 | 43 | 44 | 45 | 46 |
| Hot-melt urethane (X) having (meth)acryloyl group | (X-41) | (X-42) | (X-1) | (X-3) | (X-43) | (X-44) |
| Hot-melt urethane (X) (part by mass) | 100 | 100 | 100 | 100 | 100 | 100 |
| Type of (meth)acrylate compound (D) having active-hydrogen-containing group | HEA | HEA | HEA | HEA | HEA | HEA |
| Ratio of number of NCO groups with which OH group of (D) reacted |  |  |  |  |  |  |
| [OH of (D)/NCO] × 100 (%) | 40 | 40 | 55 | 100 | 100 | 100 |
| Properties of hot-melt urethane (X) having (meth)acryloyl group |  |  |  |  |  |  |
| Melt viscosity (mPa·s/100° C.) | 2220 | 3620 | 3720 | 3760 | 3900 | 4000 |
| NCO % | 1.50 | 1.50 | 1.90 | 0.00 | 0.00 | 0.00 |
| Radical polymerization initiator (Y) (part by mass) |  |  |  |  |  |  |
| IRGACURE 184 (Y-1) | 2 | 2 | — | — | 2 | 2 |
| PEROYL TCP (Y-2) | — | — | — | — | — | — |
| Evaluation results |  |  |  |  |  |  |
| No. of cured film | 41 | 42 | 43 | 44 | 45 | 46 |
| Heat stability: | Good | Good | Good | Good | Good | Good |
| Melt viscosity V12 after 100° C. × 12 hours (mPa·s/100° C.) | 2350 | 3700 | 3850 | 3760 | 4200 | 4000 |
| Transparency: total light transmittance (wavelength 900 nm) | Good | Good | *1 | *1 | Good | Good |
| (%) (wavelength 400 nm) | Good | Good | *1 | *1 | Poor | Poor |
| Film properties: flexibility | Good | Good | *1 | *1 | Good | Good |
| Mechanical properties in normal state |  |  |  |  |  |  |
| 100% modulus (MPa) | 1.3 | 1.5 | *1 | *1 | 4.7 | 4.8 |
| Breaking stress (MPa) | 30.0 | 30.0 | *1 | *1 | 36.0 | 38.0 |
| Breaking elongation (%) | 305 | 300 | *1 | *1 | 220 | 240 |
| Durability: mechanical properties after hydrolysis resistance test | Poor | Poor | *1 | *1 | Good | Good |
| 100% modulus (MPa) | 1.0 | 1.1 | *1 | *1 | 3.0 | 3.2 |
| Breaking stress (MPa) | 15.0 | 10.0 | *1 | *1 | 36.0 | 38.0 |
| Breaking elongation (%) | 180 | 150 | *1 | *1 | 220 | 240 |
| Yellowing property | Good | Good | *1 | *1 | Good | Good |
| Quick-curing property | Fair | Fair | Poor | Poor | Good | Good |

|  | Comparative Example 13 | Comparative Example 14 | Comparative Example 15 | Comparative Example 16 |
|---|---|---|---|---|
| Short for NCO-terminated urethane prepolymer (C) | (C-16) | (C-17) | (C-7) | (C-7) |
| Polyol (A) (part by mass) |  |  |  |  |
| Aliphatic polycarbonate polyol (a1) |  |  |  |  |
| DURANOL T5652 (1,5PG/HG:PC-2000) (a1-1) | — | — | — | — |

TABLE 2-continued

| | | | | |
|---|---|---|---|---|
| Alicyclic polycarbonate polyol (a2) | | | | |
| UC100 (CHDM:PC-1000) (a2-1) | — | — | 20 | 20 |
| Aliphatic polyether polyol (a3) | | | | |
| PTMG-2000 (a3-3) | 48 | — | — | — |
| Other polyols | | | | |
| NPG/DEG/OPA (Mn = 1000) | — | — | 60 | 60 |
| HG/NPG/AA (Mn = 2000) | — | 48 | — | — |
| TMP | 10 | 10 | — | — |
| Alicyclic polyisocyanate (B) (part by mass) | | | | |
| HMDI (B-1) | — | — | 35 | 35 |
| IPDI (B-3) | 42 | 42 | — | — |
| Total | 100 | 100 | 115 | 115 |
| Properties of NCO-terminated urethane prepolymer (C) | | | | |
| NCO % | 3.20 | 3.20 | 3.91 | 3.91 |
| Melt viscosity (mPa·s/100° C.) | 800 | 960 | 2200 | 2200 |
| Softening temperature (° C.) | 32 | 52 | 35 | 35 |
| Radical-curable hot-melt urethane resin composition (RHM) | 47 | 48 | 49 | 50 |
| Hot-melt urethane (X) having (meth)acryloyl group | (X-45) | (X-46) | (X-47) | (X-48) |
| Hot-melt urethane (X) (part by mass) | 100 | 100 | 100 | 100 |
| Type of (meth)acrylate compound (D) having active-hydrogen-containing group | HEA | HEA | HEA | HEA |
| Ratio of number of NCO groups with which OH group of (D) reacted | | | | |
| [OH of (D)/NCO] × 100 (%) | 40 | 40 | 100 | 100 |
| Properties of hot-melt urethane (X) having (meth)acryloyl group | | | | |
| Melt viscosity (mPa·s/100° C.) | 800 | 960 | 2200 | 2200 |
| NCO % | 2.85 | 2.90 | 0.00 | 0.00 |
| Radical polymerization initiator (Y) (part by mass) | | | | |
| IRGACURE 184 (Y-1) | 3.9 | 3.9 | 0.3 | 7 |
| PEROYL TCP (Y-2) | — | — | — | — |
| Evaluation results | | | | |
| No. of cured film | 47 | 48 | 49 | 50 |
| Heat stability: | Poor | Poor | Good | Good |
| Melt viscosity V12 after 100° C. × 12 hours (mPa·s/100° C.) | 1100 | 1200 | 2250 | 2300 |
| Transparency: total light transmittance (%) (wavelength 900 nm) | Good | Good | Good | Good |
| (wavelength 400 nm) | Good | Poor | Good | Good |
| Film properties: flexibility | Poor | Poor | Poor | Good |
| Mechanical properties in normal state | | | | |
| 100% modulus (MPa) | 6.5 | 7.5 | 0.8 | 3.2 |
| Breaking stress (MPa) | 12.0 | 15.0 | 2.5 | 30.0 |
| Breaking elongation (%) | 100 | 120 | 50 | 320 |
| Durability: mechanical properties after hydrolysis resistance test | Good | Poor | Good | Good |
| 100% modulus (MPa) | 6.5 | 5.0 | 0.4 | 3.3 |
| Breaking stress (MPa) | 12.0 | 10.0 | 2.0 | 30.0 |
| Breaking elongation (%) | 100 | 80 | 20 | 310 |
| Yellowing property | Good | Good | Good | Poor |
| Quick-curing property | Good | Good | Poor | Good |

*1: could not be measured

The abbreviations used in Tables 1 and 2 stand for the following.
1,5PD: 1,5-pentanediol
1,6HD: 1,6-hexanediol
NPG: neopentyl glycol
DEG: diethylene glycol
AA: adipic acid
TMP: trimethylolpropane
HMDI: dicyclohexylmethane-4,4'-diisocyanate
BICH: 1,3-bis(isocyanatomethyl)cyclohexane
MDI: 4,4'-diphenylmethane diisocyanate
IPDI: isophorone diisocyanate
XDI: xylylene diisocyanate
HEA: 2-hydroxyethyl acrylate
4HBA: 4-hydroxybutyl acrylate
HEMA: 2-hydroxyethyl methacrylate
PTMG-1000: trade name, manufactured by Mitsubishi Chemical Corporation, polytetramethylene glycol, Mn=1000
PTXG-1000: trade name, manufactured by Asahi Kasei Fibers Corp., polytetramethylene glycol derivative, which is a chain diol composed of a random copolymer of tetramethylene ether and neopentyl glycol, Mn=1000
CHDM: cyclohexanedimethanol
SUCA: succinic acid
CHDM/SUCA-1000: polymer of cyclohexanedimethanol and succinic acid (Mn=1000)
HHPA: hexahydrophthalic anhydride
DURANOL T-5652: trade name, manufactured by Asahi Kasei Chemicals Corp., an aliphatic polycarbonate polyol with Mn=2000 obtained by a reaction of a dialkyl carbonate and a polyol containing 1,5-pentanediol and 1,6-hexanediol UC-100: manufactured by Ube Industries, Ltd., an alicyclic polycarbonate polyol with Mn=1000 obtained by a reaction of cyclohexanedimethanol and a dialkyl carbonate IRGACURE 651: trade name, manufactured by Ciba Specialty Chemicals, photopolymerization initiator IRGACURE 184: trade name, manufactured by Ciba Specialty Chemicals, photopolymerization initiator PEROYL TCP: trade name, manufactured by NOF CORPORATION, peroxydicarbonate-based peroxide

INDUSTRIAL APPLICABILITY

The radical-curable hot-melt urethane resin composition of the present invention has two properties of a hot-melt property that provides a heat-melted state during the application but achieve quick curing by cooling after application onto a base and a quick-curing property achieved by irradiation with active energy rays such as infrared rays, visible light, ultraviolet rays, X rays, electron beams, α rays, β rays, γ rays, or sunlight, and also has excellent properties such as appropriate flexibility, durability (particularly hydrolysis resistance), transparency (light permeability), heat stability, yellowing resistance (non-yellowing), adhesion to a base, and productivity (quick-curing property). Therefore, the radical-curable hot-melt urethane resin composition is useful not only for optical molded bodies (light-guiding articles such as a light-guiding film, a light-guiding sheet, a protective film, a key sheet film, an optical film, a light-guiding plate, and a light-guiding fiber) but also in various applications of an adhesive, an adhesive, a coating agent, and a tackiness agent.

The invention claimed is:

1. A radical-curable hot-melt urethane resin composition comprising 100 parts by mass of a hot-melt urethane (X) having a (meth)acryloyl group and 0.5 to 5.0 parts by mass of a radical polymerization initiator (Y), wherein the hot-melt urethane (X) is obtained by introducing, using a (meth)acrylate compound (D) having an active-hydrogen-containing group, a (meth)acryloyl group into a hot-melt urethane prepolymer (C) that has isocyanate groups at its terminals, has a melt viscosity of 500 to 5000 mPa·s at 100° C., and is obtained by a reaction of a polyol (A) and an alicyclic polyisocyanate (B), the polyol (A) containing an aliphatic polycarbonate polyol (a1), an alicyclic polycarbonate polyol (a2), or an aliphatic polyether polyol (a3), in an amount of more than 50 mol % and 100 mol % or less of the total number of isocyanate groups of the urethane prepolymer (C),
  wherein the polyol (A) further contains an alicyclic polyester polyol (a4).

2. The radical-curable hot-melt urethane resin composition according to claim 1, wherein the aliphatic polyether polyol (a3) is polytetramethylene glycol or a derivative of polytetramethylene glycol.

3. The radical-curable hot-melt urethane resin composition according to claim 1, wherein the polyol (A) is a polyol containing 20 parts by mass or more in total of the aliphatic polycarbonate polyol (a1), alicyclic polycarbonate polyol (a2), and aliphatic polyether polyol (a3) relative to 100 parts by mass in total of the polyol (A).

4. The radical-curable hot-melt urethane resin composition according to claim 1, wherein the alicyclic polyester polyol (a4) is a polyol having a cyclohexane ring.

5. The radical-curable hot-melt urethane resin composition according to claim 1, wherein the polyol (A) is a polyol containing 20 to 95 parts by mass of the aliphatic polycarbonate polyol (a1) or alicyclic polycarbonate polyol (a2), 20 to 95 parts by mass of the aliphatic polyether polyol (a3), and 10 to 50 parts by mass of the alicyclic polyester polyol (a4) relative to 100 parts by mass in total of the polyol (A).

6. The radical-curable hot-melt urethane resin composition according to claim 1, wherein the alicyclic polyisocyanate (B) is at least one polyisocyanate selected from 4,4'-dicyclohexylmethane diisocyanate, isophorone diisocyanate, and 1,3-bis(isocyanatomethyl)cyclohexane.

7. An optical molded body produced from the radical-curable hot-melt urethane resin composition according to any one of claims 1-3 and 4-6.

8. The optical molded body according to claim 7, wherein the optical molded body is at least one light-guiding article selected from a light-guiding film, a light-guiding sheet, a light-guiding plate, and a light-guiding fiber.

* * * * *